(12) United States Patent
Narampanawe et al.

(10) Patent No.: US 12,089,004 B2
(45) Date of Patent: Sep. 10, 2024

(54) METHOD FOR CHARGING A DEVICE, DEVICE AND CHARGER

(71) Applicant: Sivantos Pte. Ltd., Singapore (SG)

(72) Inventors: Nishshanka Bandara Narampanawe, Singapore (SG); Heng Goh Yap, Singapore (SG); Gee Heng Ler, Penang (MY); Sooriya Bandara Rathnayaka Mudiyanselage, Singapore (SG); Chuan En Andrew Ong, Singapore (SG)

(73) Assignee: Sivantos Pte. Ltd., Singapore (SG)

( * ) Notice: Subject to any disclaimer, the term of this patent is extended or adjusted under 35 U.S.C. 154(b) by 171 days.

(21) Appl. No.: 17/851,272

(22) Filed: Jun. 28, 2022

(65) Prior Publication Data

US 2022/0417673 A1 Dec. 29, 2022

(30) Foreign Application Priority Data

Jun. 28, 2021 (DE) ...................... 10 2021 206 657.7

(51) Int. Cl.
*H04R 25/00* (2006.01)
*H02J 7/00* (2006.01)
*H02J 50/10* (2016.01)

(52) U.S. Cl.
CPC .......... *H04R 25/30* (2013.01); *H02J 7/00034* (2020.01); *H02J 7/007182* (2020.01); *H02J 50/10* (2016.02); *H04R 25/554* (2013.01); *H04R 2225/31* (2013.01)

(58) Field of Classification Search
CPC .. H04R 25/30; H04R 25/554; H04R 2225/31; H02J 7/00034
See application file for complete search history.

(56) References Cited

U.S. PATENT DOCUMENTS

| 10,887,696 | B2 | 1/2021 | Trommer |
| 2004/0052392 | A1 | 3/2004 | Sacha et al. |
| 2016/0308386 | A1* | 10/2016 | Tang .................... H04R 25/305 |

(Continued)

FOREIGN PATENT DOCUMENTS

| CN | 110460930 A | 11/2019 |
| CN | 112543404 A | 3/2021 |

(Continued)

*Primary Examiner* — Sunita Joshi
(74) *Attorney, Agent, or Firm* — Laurence A. Greenberg; Werner H. Stemer; Ralph E. Locher

(57) ABSTRACT

A method includes connecting a device to a charger and providing wireless charging in a state of charge by transferring energy wirelessly from a transmitter module of the charger to a reception module of the device. The device has a state of discharge in which energy is consumed. The device includes a charging connector, to which a charging input voltage adjustable by the charger is applied for charging. The device includes a switching connector for turning the device on and off. The device includes a switch connected to the switching connector and being switchable by the charging input voltage by setting the charging input voltage to an intermediate voltage. The charger sets the charging input voltage to the intermediate voltage for switching the switch and transitioning the device into an off state with the device turned off. A corresponding device and charger are also provided.

13 Claims, 8 Drawing Sheets

(56) References Cited

U.S. PATENT DOCUMENTS

| | | |
|---|---|---|
| 2018/0014104 A1 | 1/2018 | Boesen et al. |
| 2018/0076635 A1* | 3/2018 | Maalouf .................. H02J 7/02 |
| 2019/0058359 A1 | 2/2019 | Hatanaka et al. |
| 2022/0182748 A1 | 6/2022 | Sui |

FOREIGN PATENT DOCUMENTS

| | | |
|---|---|---|
| DE | 4036479 A1 | 5/1992 |
| DE | 102004059006 A1 | 6/2006 |
| DE | 102019100104 A1 | 7/2020 |

* cited by examiner

METHOD FOR CHARGING A DEVICE, DEVICE AND CHARGER

CROSS-REFERENCE TO RELATED APPLICATION

This application claims the priority, under 35 U.S.C. § 119, of German Patent Application DE 10 2021 206 657.7, filed Jun. 28, 2021; the prior application is herewith incorporated by reference in its entirety.

FIELD AND BACKGROUND OF THE INVENTION

The invention relates to a method for charging a device, a device and a charger.

In the present case, a "device" is understood to be a mobile device, and therefore the device is transportable in general and includes its own energy storage unit for supplying power. The device is regularly assigned to an individual user and is optionally adapted on an individual basis to the latter. The energy storage unit is regularly a secondary cell (for example a lithium rechargeable battery) which is able to be charged by connecting the mobile device to a charger. To that end, the device is connected either by contact or wirelessly to the charger in order to transfer energy from the charger to the device and to then use that energy to charge the device, more precisely the energy storage unit thereof.

A specific example of a device is a hearing aid which is used to provide for a user who has a hearing deficiency. To that end, the hearing aid has a microphone which captures sound from the surroundings and generates an electrical input signal. That is fed to a signal processor of the hearing aid for modification. The modification takes place in particular on the basis of an individual audiogram of the user so that an individual hearing deficiency of the user is compensated. The signal processor outputs as a result an electrical output signal, which is then converted back into sound and output to the user through a receiver of the hearing aid. Instead of the microphone and the receiver, other input and/or output transducers are also possible depending on the type of hearing aid. The hearing aid has a binaural or monaural embodiment, that is to say for use on both sides or only on one side of the head of the user.

Other examples for devices are headphones, headsets, wearables, smartphones and similar devices.

The device is in a state of charge during charging. After charging and despite the device still being connected to the charger, the device is typically switched on and transitions into a state of discharge or the charger continues to transfer energy to prevent the switchover into the state of discharge. Energy is disadvantageously consumed in both cases.

SUMMARY OF THE INVENTION

It is accordingly an object of the invention to provide a method for charging a device, a device and a charger, which overcome the hereinafore-mentioned disadvantages of the heretofore-known methods, devices and chargers of this general type and which reduce energy consumption after charging.

With the foregoing and other objects in view there is provided, in accordance with the invention, a method in which:

a device is connected to a charger,
the device has a state of charge in which there is wireless charging by virtue of energy being transferred wirelessly from a transmitter module of the charger to a reception module of the device,
the device has a state of discharge in which energy is consumed,
the device includes a charging connector, to which a charging input voltage that is adjustable by the charger is applied for charging purposes,
the device includes a switching connector for turning the device on and off,
the device includes a switch which is connected to the switching connector and which is switchable by the charging input voltage by virtue of the charging input voltage being set to an intermediate voltage, and
the charger sets the charging input voltage to the intermediate voltage in such a way that the switch is switched and the device transitions into an off state, in which the device is turned off.

With the objects of the invention in view, there is also provided a device configured to carry out the method.

With the objects of the invention in view, there is furthermore provided a charger configured to carry out the method.

Advantageous configurations, developments and variants are the subject matter of the dependent claims. The explanations in relation to the method also apply, mutatis mutandis, to the device and the charger and vice versa. Where steps of the method are described below, advantageous embodiments of the device and the charger arise in each case by virtue of these being configured to carry out one or more of the steps, in particular by using a respective control unit in the device or in the charger.

Within the scope of the method, a device is connected to a charger and there is wireless charging in a state of charge by virtue of energy being transferred wirelessly from a transmitter module of the charger to a reception module of the device. The device is switched off during charging and is in the state of charge. The device includes a charging connector, to which a charging input voltage $V_{CC}$ that is adjustable by the charger is applied for charging purposes. The device further includes a switching connector, for turning the device on and off. The charging connector and the switching connector are preferably connectors of a power management module (also referred to as PMIC) of the device. The power management module accepts the charging input voltage and uses this to charge an energy storage unit, for example a lithium rechargeable battery, of the device.

The device also has a state of discharge in which energy is consumed, specifically by one or more consumers of the device. In the state of discharge, the power management module controls the provision of energy for the consumers from the energy storage unit of the device. Consequently, the device receives energy from the charger in the state of charge and the device consumes the energy in the state of discharge. The device is necessarily connected to the charger in the state of charge while the device is either separated from, or connected to, the charger in the state of discharge. In this case, "the device is switched on" is understood to mean that the consumers are supplied with energy, in particular by using the power management module, and "the device is switched off" then is understood to mean that the consumers are not supplied with energy but equally the power management module may still consume energy. As a matter of principle, the device is also switched on in the state of discharge. Provided the description below refers to the device being "switched off", this is understood to mean that, firstly, the device "is switched off" if it is switched on and, secondly, the device "remains switched off" if it has already been switched off.

Moreover, the device includes a switch which is connected to the switching connector and which is switchable by the charging input voltage by virtue of the charging input voltage being set to an intermediate voltage. In particular, the switch is part of a switch-off circuit of the device. The charger sets the charging input voltage to the intermediate voltage in such a way that the switch is switched and the device transitions into an off state, in which the device is turned off. In particular, this is understood to mean the following: The device is (i.e., is or remains) switched off by using the charger by virtue of the charger setting the charging input voltage to the intermediate voltage in such a way that the switch is switched and the device transitions into an off state. This, that is to say the setting of the intermediate voltage and the subsequent transition into the off state, is implemented in particular when the charging is terminated or interrupted but in principle may also occur generally in the case of a fault, for example should the energy storage unit overheat or have an overvoltage/overcurrent. Hence, an automatic switch off is realized by way of the charger as soon as energy is no longer transferred to the device. Hence, the charger initiates a transition of the device into the off state in which the device—unlike in the state of discharge—no longer consumes any energy. In this case, the charger uses the option of variably setting the charging input voltage. Consequently, the automatic switch off advantageously saves energy after the charging since the device is switched off and hence precisely does not transition into the state of discharge.

The device is a mobile device and hence transportable in general. The device is regularly assigned to an individual user and is optionally adapted on an individual basis to the latter. The energy storage unit is regularly a secondary cell (e.g., lithium rechargeable battery) which is able to be charged by connecting the device to the charger.

The device preferably is a hearing aid which is used to provide for a user who has a hearing deficiency. To this end, the hearing aid has a microphone which captures sound from the surroundings and generates an electrical input signal. This is fed to a signal processor of the hearing aid for modification. The modification takes place in particular on the basis of an individual audiogram of the user so that an individual hearing deficiency of the user is compensated. The signal processor outputs as result an electrical output signal, which is then converted back into sound and output to the user through a receiver of the hearing aid. Instead of the microphone and the receiver, other input and/or output transducers are also possible depending on the type of hearing aid. The hearing aid has a binaural or monaural embodiment, that is to say for use on both sides or only on one side of the head of the user. Consumers of the device include an input transducer (e.g., microphone), an output transducer (e.g., a receiver), and signal processor.

Alternatively, the device is a headphone, a headset, a wearable, a smartphone, or the like.

For charging, the device is connected to the charger and fittingly placed or inserted into, or placed onto, the latter to this end. By way of example, the charger is in the form of a charging tray with a depression into which the device is placeable. Optionally, the charger includes a lid to close the charger and cover the depression in the process so that the device overall is enclosed in the interior of the charger Expediently, the depression is shaped so that the device is held therein in an arrangement relative to the charging tray that is as defined as possible.

Depending on the charging level in the energy storage unit, that is to say how fully charged the energy storage unit is, the latter provides a voltage $V_{bat}$ for one or more consumers, the voltage optionally still being transformed by a transformation unit, e.g., in the power management module, in such a way that the latter then outputs a voltage $V_{out}$ to the consumers. The higher charging level, the higher this voltage typically is. The device is charged by the charger with a charging input voltage $V_{cc}$, with the charging input voltage being the voltage present in the device for charging the energy storage unit. Then, the energy storage unit is charged until the desired charging level or voltage has been reached. It is fitting that a charging threshold voltage $V_{chg,thres}$ is specified to this end, the latter being compared to the charging input voltage in order to define when there is charging, and when not. Preferably, the charging is completed once the charging input voltage drops below the charging threshold voltage. By way of example, the charging threshold voltage is a fixed voltage.

An automatic switch off is advantageous for switching off the device (i.e., the device is or remains switched off) after the latter has been fully charged. In the present case, the automatic switch off is carried out by the device itself but it is not self-initiated; instead, this is initiated by the charger in such a way that the automatic switch off more precisely is an "externally prompted, automatic switch off". The charger determines when the device should be switched off and thereupon transmits a switch-off signal to the device in such a way that the latter is switched off. In the present case, the switch-off signal leads to the intermediate voltage being present in the device. Without an automatic switch off, the device would continuously be switched on even after charging and energy would be continuously consumed, especially by the power management module as a minimum, for the operation of the latter. Even if the current used in this case is typically only small, the device nevertheless consumes energy. Optionally, this energy continues to be taken from the charger as well, while the latter still is connected to the device following the actual charging. Especially in the case of a portable charger with its own energy storage unit, this energy storage unit would be continuously discharged by the device, especially in order to prevent the device from switching on and transitioning into the state of discharge. Moreover, there regularly are specifications that should ensure that a device is compatible with other devices. By way of example, one such specification is "Made for iPhone/iPod/iPad", abbreviated MFi. By way of example, one specification requires that a BLE (Bluetooth low energy) function of the device be deactivated and hence the device not be operated in a coupling mode or in an advertising mode for as long as the device is connected to the charger and for as long as there is no explicit user input for activating the BLE function. Thus, in respect of the coupling mode, the specification accordingly requires that the device, while connected to the charger, should not be couplable to another device. In respect of the advertising mode, the specification then requires that the device, while connected to the charger, should not transmit a ready signal (for indicating the own readiness for coupling) to other devices.

However, some scenarios might lead to the device, while still connected to the charger, being switched on or being on after charging, and hence being operated in the state of discharge, in which—contrary to the specification—the BLE function is also activated. A first such scenario is a power outage, during which an energy supply by the charger is interrupted. A second scenario is a removal of a power cable of the charger, the cable connecting the charger to a power grid, for example through a domestic plug socket. In principle, the second scenario is similar to the first scenario. A third scenario is that an energy storage unit of a portable charger is completely discharged, and so the charger no longer can provide any energy for charging the device. Energy is no longer transferred to the device in any of these scenarios, and the device is therefore typically put into the state of discharge. As a consequence, the device is switched on rather than switched off. Accordingly, energy-consuming functions, for example the BLE function, are then also activated.

It is therefore desirable in general, but also specifically due to the specification as described, for the device to be switched off after charging, for as long as the device still is connected to the charger. Where possible, the device should not be put into the state of discharge and switched on after the state of charge has been completed, instead the device should be switched off.

In order to meet the specification, it is advantageous to use the charging connector of the power management module of the device to realize an automatic switch off and thereby switch the device off after charging. The charging connector is an electrical contact, for example a contact pin, through the use of which the device is connected to the charger for charging purposes, hence also leading to conductive coupling between these in the case of connected-by-contact charging. The charging input voltage is applied to the charging connector, and so the charging connector is a power contact in general. The switching connector is also in the form of a contact pin, for example. In particular, the switching connector is pulled up using a pull-up resistor. Expediently, a manually actuatable switch is connected between the switching connector and ground for the purposes of manually switching off the device. For the automatic switch-off by using the charger, the device includes, independently thereof, the aforementioned switch-off circuit with switch, which uses the charging connector and the switching connector. The switch preferably is a transistor having gate, source, and drain, that is to say with appropriate connectors. In this case, and below, the terms gate, drain, and source are used to label the three connectors of the transistor. However, the explanations apply very generally to any switch with three connectors, which are functionally equivalent to the gate, source, and drain of a transistor. The gate of the transistor is pulled up to the charging input voltage by way of the charging connector and by way of a resistor of the switch-off circuit. The resistor connects the gate to the source and to ground. The drain and the source of the transistor are connected to the switching connector and to ground, respectively.

Very generally, and specifically by using the switch-off circuit as described above, an additional operating state for the device is advantageously realized by way of the automatic switch off, specifically the off state in which the device is connected to the charger but switched-off in the process, and hence neither consumes energy itself nor receives energy from the charger. By contrast, the device is switched off in the state of charge, but still receives energy in the process (in particular for operating the power management module), and switched on and consumes energy in the state of discharge. In order to switch between the state of charge and the state of discharge (in both directions), the device additionally still has an idle state, in particular, and so a total of four operating states are possible, which in particular also preclude one another.

The device preferably transitions into the state of charge from the state of discharge, from the off state, or from the idle state when the charging input voltage at least corresponds to the charging threshold voltage. The state of charge remains active for as long as the charging input voltage at least corresponds to the charging threshold voltage. The device transitions from the state of charge into the idle state once the charging input voltage is less than the charging threshold voltage. The device transitions from the idle state into the state of discharge once the charging input voltage is less than a reset voltage $V_{rst}$ and additionally, in particular, once a time that is longer than a discharge time $t_{disc}$ has also elapsed. By way of example, the reset voltage is a fixed voltage and, in particular, a parameter of the power management module. In particular, the reset voltage serves to stop the operation of the power management module and to initialize the latter in a predefined standard state by virtue of a voltage that at least corresponds to the reset voltage being applied to the power management module. This initialization subsequently facilitates an orderly operation. In the present case, the reset voltage is in particular also used to define when the transition from the idle state to the state of discharge occurs. By way of example, the discharge time is a fixed time of a few seconds. Conversely, the device transitions from the state of discharge into the idle state if the charging input voltage is less than the charging threshold voltage and greater than the reset voltage, and transitions from the idle state to the state of charge if the charging input voltage at least corresponds to the charging threshold voltage. The idle state remains active for as long as the charging input voltage is less than the charging threshold voltage.

The automatic switch off, that is to say a transition into the off state, now is realized by virtue of the charging input voltage at the charging connector being set to an intermediate voltage which is a gate-source threshold voltage $V_{gs-thres}$ of the transistor and advantageously lies between the reset voltage and a minimum gate-source threshold voltage, that is to say a minimum value for the gate-source threshold voltage. The gate-source threshold voltage is the voltage required to switch (in particular switch on) the transistor and in particular lies in a range between the minimum gate-source threshold voltage (the minimum voltage required to switch the transistor) and a maximum gate-source threshold voltage (the highest possible voltage for switching the transistor). In particular, the reset voltage is greater than the actually used gate-source threshold voltage but the maximum gate-source threshold voltage may be greater than the reset voltage. Expediently, the transistor has a difference between the minimum gate-source threshold voltage and the maximum gate-source threshold voltage that is as large as possible. By way of example, the maximum gate-source threshold voltage is 20 V.

Now, a voltage range used to transition into the off state is spanned for the intermediate voltage between, firstly, the minimum gate-source threshold voltage and, secondly, the reset voltage. If the charging input voltage is less than the reset voltage, the device transitions into the state of discharge. In principle, the state of discharge initially is active for as long as the charging input voltage is less than the minimum gate-source threshold voltage. The device transitions into the off state once the charging input voltage is less than the reset voltage and greater than the charging threshold voltage and, additionally, in particular once a time (during which the intermediate voltage is held) that is longer than a switching connector active time $t_{sca}$ has elapsed. Accordingly, as soon as the intermediate voltage has been reached at the gate of the transistor, the transistor is switched and the switching connector is pulled to ground. The device briefly transitions into the state of discharge and, from there, into the off state, in particular after the switching connector active time. By way of example, the switching connector active time is a fixed time of, e.g., a few seconds. Preferably, a transition into the off state is only possible proceeding from the state of discharge.

A switch-on of the device and, specifically, a transition from the off state into the state of discharge is possible initially through the state of charge. In a suitable embodiment, the device transitions from the off state into the state of charge once the charging input voltage at least corresponds to the charging threshold voltage. Alternatively or in addition, a transition from the off state is possible by way of a manual switch-on of the device by the user. To this end, the device includes a switch in particular, for example a button, pushbutton, slide switch or something comparable.

The described solution for the automatic switch-off of the device is readily possible in the case of connected-by-contact charging since there is a conductive connection in this case, through the use of which the intermediate voltage can easily be set. Since the charging input voltage is provided directly by the charger, the intermediate voltage is able to be set equally easily. However, in the case of a charger for wireless charging this is not readily possible since the charging input voltage is not provided directly by the charger, but merely induced in the device thereby by using the transmitter module, and consequently is not necessarily present in the charger itself. However, without an automatic switch-off, the charger must continuously transfer energy to the device in order to prevent an activation of the state of discharge and, should the energy supply be interrupted, the device would regularly be put into the state of discharge automatically, optionally with an idle state activated therebetween, as described above. A starting point of the present invention now is, in particular, the intent to realize the off state, as described above, specifically for a charger for wireless charging, that is to say precisely not in connected-by-contact fashion but in wireless fashion. The explanations above apply both to connected-by-contact and wireless charging. In the case of a charger for wireless charging, the energy transfer from the charger to the device is effected by using a transmitter module in the charger and a reception module in the device.

During charging, there is an energy transfer preferably by using a magnetic field which is produced using a transmitter coil of the transmitter module and which is received by a reception coil of the reception module. In order to then set the charging input voltage to the intermediate voltage in the case of a wireless charger, the transmitter module is accordingly controlled in such a way that the intermediate voltage is induced in the device. In particular, an important advantage of the present invention is that the device is switched off wirelessly using the charger. To this end, the magnetic field of the charger is used to set to the charging input voltage at the intermediate voltage in such a way that the device transitions into the off state. Hence, a wireless automatic switch-off by using a magnetic field is realized. The magnetic field otherwise used for charging purposes consequently simultaneously represents the switch-off signal, which is transmitted from the charger to the device, when actuated accordingly. To this end, the device and the charger are accordingly suitably configured. In particular, the magnetic field, which in general induces the charging input voltage in the device, is altered within the charger in such a way that the intermediate voltage is produced. In particular, the off state is automatically activated whenever the device is fully charged or the charger no longer provides any energy (see the various scenarios above) so that the device then is switched off and consumes no energy. Furthermore, the wireless automatic switch-off is advantageous since, as a result, a freer spatial arrangement of the device and of the charger relative to one another is possible in comparison with a connected-by-contact automatic switch-off, at least within the boundaries within which an energy transfer for charging purposes still is possible.

Together, the charger and the device for wireless charging form a wireless charging system. In addition to the power management module and the energy storage unit, the device in particular still includes the aforementioned reception module and one or more consumers. In the state of discharge, the consumers are operated using energy from the energy storage unit; examples of consumers include a BLE module, which provides a BLE function, a signal processing unit or electroacoustic consumers, for example a receiver or a microphone. The reception module provides the charging input voltage and outputs the latter to the power management module. The reception module is configured to receive energy from the charger, the latter accordingly including the aforementioned transmitter module for the purposes of transmitting the energy. Fittingly, the transmitter module for transmitting energy includes a transmitter coil and the reception module analogously includes a reception coil for receiving the energy. In general, the transmitter coil is operated using a power source of the charger. Expediently, the reception module includes wiring for the reception coil in order to produce the charging input voltage. By way of example, the wiring includes a tuning capacitor, a smoothing capacitor and a Schottky diode.

The charging input voltage $V_{cc}$ typically depends on a multiplicity of parameters, in particular on the current $I_{tx}$ to the transmitter coil, the respective inductance of the transmitter coil $L_{tx}$ and of the reception coil $L_{rx}$, a transfer frequency f, which is used for the transfer of energy by using the magnetic field, and a coupling factor k. The coupling factor in turn depends, in particular, on the distance and on the angle of inclination between the transmitter coil and the reception coil, that is to say in general on the spatial arrangement of the charger and the device during charging. The smaller the distance and the smaller the angle of inclination, the greater the coupling factor. In general, the following applies to the charging input voltage: $V_{cc} \propto 2\pi \cdot f \cdot k \cdot \sqrt{(L_{tx} \cdot L_{rx})} \cdot I_{tx}$. What specifically becomes clear from this is that the charging input voltage actually present in the device depends on a few parameters (transfer frequency, inductance of the transmitter coil, current for operating the transmitter coil) of the charger and is accordingly manipulable by the latter.

In principle, the switch-off circuit for the wireless automatic switch-off has the same configuration as for the connected-by-contact automatic switch-off. Expressed differently: the switch-off circuit includes a switch, preferably a transistor, which is switched (in particular switched on) by the intermediate voltage. The transistor of the switch-off circuit preferably is a MOSFET. It is fitting that the resistor, connecting gate and source of the transistor, has a high value, for example 100 kΩ, and generally preferably has a value between 10 kΩ and 1 MΩ. The gate is pulled up to the charging input voltage of the reception module. The drain is connected to the switching connector of the power management module and the source is connected to ground. As already described previously, four operating states, including the off state, are facilitated in this way.

For the wireless energy transfer, the charger fittingly still includes a converter and an oscillator. The oscillator produces a current for operating the transmitter coil and accordingly is a power source. Then, the transmitter coil and the oscillator form the transmitter module. By way of example, the oscillator is an inverter or power amplifier and generally produces a current (i.e., alternating current) for producing the magnetic field by way of the transmitter module. By contrast, the converter produces a converter voltage for operating the oscillator. Consequently, the converter influences the current with which the transmitter coil is operated. The charging input voltage and hence specifically also the intermediate voltage is thus set by using the converter voltage. Preferably, the converter is a down converter (also referred to as a buck converter), which is configured to convert an input voltage into a comparatively reduced output voltage, specifically the converter voltage. In particular, the converter is connected or connectable to an energy source for the charger, for example to an energy storage unit of the charger or to a power grid outside of the charger.

For fixed values of the inductances of transmitter coil and reception coil and of the transfer frequency, the charging input voltage increases, especially linearly in each case, firstly with increasing coupling factor and secondly with increasing current to the transmitter coil. These two relationships, specifically between charging input voltage and coupling factor on the one hand and between charging input voltage and current on the other hand, are advantageously used in the present case, given a known coupling factor, to control the charging input voltage in the device by using the current to the transmitter coil in the charger, and hence to activate the off state in a targeted manner. The converter voltage of the converter in the charger controls the oscillator, which in turn controls the current to the transmitter coil. Consequently, the current to the transmitter coil is initially adjustable by using the converter and its converter voltage, and ultimately the charging input voltage in the device is as well, the latter thus also being adjustable to the intermediate voltage. The off state of the device is then activated externally by the charger by way of a suitable control of the converter and an adjustment of its converter voltage. As described above, the relationship between converter voltage $V_{dd}$ and charging input voltage $V_{cc}$ is given by $V_{cc} \propto 2\pi \cdot f \cdot k \cdot \sqrt{(L_{tx} \cdot L_{rx})} \cdot I_{tx}$, with the current $I_{tx}$, as described, being a function of the converter voltage $V_{dd}$; fittingly, the current is proportional to the converter voltage.

The converter voltage to be set in order to produce a certain charging input voltage and, in particular, the intermediate voltage is—as described above—dependent on the coupling factor between the transmitter module and the reception module, and can vary as a matter of principle. By contrast, inductances and the transfer frequency are known for a given charging system as a matter of principle. The transfer frequency is preferably between 3 MHz and 30 MHz, and is 13.56 MHz for example. Therefore, for the purposes of producing the intermediate voltage, the converter voltage, and hence also the current, is set in a preferred embodiment by virtue of initially determining the coupling factor and then using the latter to determine the converter voltage that is required to produce the intermediate voltage. This is implemented on the basis of the relationship between charging input voltage and converter voltage, specifically $V_{cc} \propto 2\pi \cdot f \cdot k \cdot \sqrt{(L_{tx} \cdot L_{rx})} \cdot I_{tx}(V_{dd})$. For the automatic switch-off, the converter voltage determined in this way then is set in such a way that the intermediate voltage is induced in the device and the device transitions into the off state.

Fittingly, the coupling factor is likewise determined by way of the relationship between the charging input voltage and the current/converter voltage, but now using a known pair of values for the charging input voltage $V_{cc}$ and the current $I_{tx}$. Since the charging input voltage is not known to the charger, communication between the charger and the device then is advantageous for determining the coupling factor. At the end of the charging process, that is to say when no energy is transferred to the device anymore, the device transmits to the charger the last charging input voltage (more precisely: the value thereof) applied during the charging. This last-applied charging input voltage is also referred to as "final charging input voltage". In particular, the final charging input voltage is greater than the reset voltage and the gate-source threshold voltage. Moreover, the charger stores the current (more precisely: its value) that is used to operate the transmitter coil at the time of the final charging input voltage, that is to say the last current applied still during charging, which is analogously referred to as final current. The final charging input voltage is transmitted through a data connection between the device and the charger. To this end, the device and the charger each have a communications unit, for example an antenna and a suitable circuit for the antenna, for transmitting and/or receiving data, specifically the final charging input voltage. The charger receives the final charging input voltage, whereupon the coupling factor is determined in combination with the final current, in particular by way of the aforementioned relationship.

Then, the converter voltage of the converter is determined using the intended intermediate voltage and the coupling factor. Since the intermediate voltage is in a voltage range between the reset voltage and the minimum gate-source threshold voltage, a suitable voltage range then also arises accordingly for the converter voltage and the converter voltage then is selected therefrom, for example simply as the mid-value of the voltage range.

In summary, setting the converter voltage consequently preferably includes the following four steps: A final current and a final charging input voltage are determined in a first step. Subsequently, the coupling factor is determined on the basis of the final current and the final charging input voltage in a second step. Subsequently, in a third step, the coupling factor and the intended intermediate voltage are used to determine the converter voltage required for the latter. Finally, this converter voltage is set in a fourth step.

The relationship respectively used to determine the coupling factor and the converter voltage is stored in a memory of the charger, for example as a function or as a table. Expediently, the relationship $V_{cc} \propto 2\pi \cdot f \cdot k \cdot \sqrt{(L_{tx} \cdot L_{rx})} \cdot I_{tx}(V_{dd})$ to this end is stored in each case as a parameterized functional bundle. In order to determine the coupling factor, the charging input voltage is saved in particular as a function of the coupling factor and parameterized by the current, and so a corresponding functional bundle arises. In order to determine the converter voltage, the charging input voltage is saved in particular as a function of the converter voltage and parameterized by the coupling factor, and so a corresponding functional bundle arises.

Typical numerical examples are described below for illustrative purposes; however, these should not be construed as restrictive but at best specified suitable orders of magnitude.

By way of example, the final charging input voltage is 7.6 V and the associated final current is 0.5 A, for example. On the basis of these values, and in combination with the inductances and the transfer frequency, the coupling factor is determined as k=0.07 in exemplary fashion. By way of example, the reset voltage is 2 V and the minimum gate-source threshold voltage is 1 V; then a voltage range of 1 V to 2 V arises for the intended intermediate voltage. By way of example, a converter voltage in the range of 0.125 V to 0.275 V is then determined for this intermediate voltage using the coupling factor of k=0.07. Then, the converter voltage is set to 0.2 V, for example, in such a way that the corresponding intermediate voltage arises in the device and the device transitions into the off state, initiated wirelessly by the charger.

In particular, a respective transistor is only suitable if its gate-source threshold voltage is, at least in certain regions, smaller than the reset voltage; by contrast, other transistors are unsuitable for the switch-off circuit. For the aforementioned reset voltage of 2 V, mentioned in exemplary fashion, a suitable transistor therefore has a minimum gate-source threshold voltage of less than 2 V, for example 1.4 V or 0.7 V.

For all distances, the reset voltage defines in particular an upper limit for the converter voltage as the latter may not exceed this value which leads to the reset voltage being exceeded in the device (reference is made in this case to distance for simplicity; however, the explanations apply in general to the coupling constant). In the case of the reset voltage of 2 V mentioned in exemplary fashion, the upper limit for the converter voltage is 0.69 V, for example. Should it not be possible to maintain the latter, an automatic switch-off may not be possible for some distances under certain circumstances. For charging purposes, it is fitting that the distance between the transmitter coil and the reception coil is between 1 mm and 10 mm. In order to facilitate an automatic switch-off for all distances, the charging input voltage must be above the gate-source threshold voltage at all distances. Automatic switch-off is not possible for those distances that do not satisfy this condition. From this, it is evident that a transistor with a minimum gate-source threshold voltage that is as low as possible facilitates an automatic switch-off for a significantly larger range of distances. In the aforementioned example with a transistor which has a minimum gate-source threshold voltage of 0.685 V, the voltage range available to the converter voltage for producing a suitable intermediate voltage for automatic switch-off at all distances is thus only 0.005 V. Then, a lower converter voltage possibly no longer suffices for an automatic switch-off at a distance of 5 mm or more. Using another transistor which has a minimum gate-source threshold voltage of 0.5 V, the voltage range available to the converter voltage for producing a suitable intermediate voltage for the automatic switch-off at all distances is approximately 0.2 V. Hence, an automatic switch-off is possible without problems over the entire range from 1 mm to 10 mm. A voltage range for the converter voltage that is as broad as possible is moreover advantageous in respect of also compensating possible tolerances.

In an exemplary application, the distance between the transmitter coil and reception coil is 4 mm. The device initially transitions into the state of charge and is charged. Then, the converter voltage of the converter is set to 0.6 V for the automatic switch-off. Hence, the charging input voltage in the device is set to an intermediate voltage of 1.5 V. The device initially transitions into the state of discharge and starts to consume energy a few seconds later, for the purposes of which the power management module provides a voltage of, e.g., 1.3 V for the consumers. The device then transitions into the off state. After a few seconds (e.g. s), the converter voltage is set to 0 V in order to deactivate the converter. Now, the charger can be switched off overall and separated from the device, with the device then remaining in the off state without returning to the state of discharge even though the charging input voltage is 0 V in that case.

As a result of the coupling factor being expediently determined for the automatic switch-off of the device, the actual spatial arrangement of device and charger is also taken into consideration automatically, and so a switch-off is advantageously largely independent of this arrangement. Hence, there is much freedom in terms of the arrangement without compromising the function of the automatic switch-off. The automatic switch-off is initiated by the charger by using its magnetic field. In contrast to the connected-by-contact automatic switch-off (i.e., with a conductive connection between device and charger), the wireless automatic switch-off (i.e., without a conductive connection between device and charger) is initially more complicated since the intermediate voltage cannot simply be set by the charger as it is only produced indirectly through the magnetic field and moreover is dependent on the coupling constant. Accordingly, suitable data, specifically the final charging input voltage, are transferred from the device to the charger. In particular, the solution for the wireless automatic switch-off described herein accordingly differs from the solution for the connected-by-contact automatic switch-off, firstly, in terms of the configuration of the charger, specifically its hardware in general and its converter and communications unit in detail, and, secondly, in terms of the configuration of the device, specifically its switch of the switch-off circuit.

With respect to the hardware in general, the charger is initially configured for wireless charging and preferably not configured for connected-by-contact charging. A contact module having corresponding electrical contacts, for example contact pins or pogo pins, for transferring energy is not required and preferably omitted. However, as described, the charger includes a transmitter module for energy transfer and, furthermore, a communications unit for data interchange with the device. By way of example, the antenna of the communications unit is spiral and/or helical and in the form of a wire or conductor track.

The device and the charger therefore each preferably include a communications unit for the interchange of data. With the communications unit of the device, the communications unit of the charger forms a communications system for data interchange. In the present case, the communications system serves in particular to at least transmit data, in particular in relation to the charging input voltage, from the device to the charger. Accordingly, the communications system can have a bidirectional configuration or only be monodirectional from the device to the charger. The communications system is preferably wireless and uses an appropriate communications protocol, for example magnetic induction in a communications frequency band in the MHz range for the purposes of transmitting data. The transfer of data is either implemented within the communications frequency band (i.e., "in-band"), for example by using amplitude modulation, or outside of the communications frequency band (i.e., "out-of-band"), for example by using frequency modulation or phase-shift keying. Accordingly, the data are in particular modulated by the device for transfer purposes (also referred to as load modulation). The data transferred from the device to the charger are in particular data in relation to the energy storage unit of the device and preferably its state of charge (SOC), current voltage, current charging current, temperature, the above-described charging input voltage or a combination thereof. The charger receives the data and in particular demodulates these (also referred to as load demodulation). For demodulation, the charger fittingly includes a demodulator circuit. In an advantageous embodiment, the demodulator circuit is also used to determine the current in the transmitter module, more precisely the current through the transmitter coil, which is integrated in the demodulator circuit to this end. To this end, the demodulator circuit fittingly includes a capacitor, at which the current emerges as a ratio of a maximum object detection voltage of the demodulator circuit and its impedance at the transfer frequency of the transmitter coil.

In the case of a connected-by-contact automatic switch-off, it is fitting that the converter is a low dropout regulator (LDO) or a down converter and outputs, as converter voltage, a voltage between the reset voltage and the minimum gate-source threshold voltage in order to switch off the device. However, this voltage range for the converter voltage is not necessarily applicable to the wireless automatic switch-off since a lower converter voltage is typically required for the switch-off in this case. In the case of the wireless automatic switch-off, the converter voltage of the converter is an input voltage for the oscillator. In particular, the oscillator is a power amplifier. Fittingly, the converter voltage is a DC voltage and the oscillator then converts the converter voltage into an AC voltage in order to accordingly produce the current for the transmitter coil as alternating current. The oscillator in particular also amplifies the converter voltage of the converter in such a way that ultimately a correspondingly larger charging input voltage arises in the device, especially if the reception coil has more turns than the transmitter coil. Should the charging input voltage be too high, in particular higher than the reset voltage, the device transitions into the state of charge or idle state, but not into the off state which is now no longer attainable. Therefore, the converter voltage of the converter is significantly lower in the case of the wireless automatic switch-off than in the case of the connected-by-contact automatic switch-off and fittingly lies in the millivolt range, that is to say in particular at least 1 mV and in any case less than 0.6 V. The converter, specifically in the embodiment as a down converter, is typically not able to produce a converter voltage below a feedback reference voltage internal to the converter, which is regularly at least 0.6 V. Hence, in a preferred embodiment, the charger includes a voltage reference circuit in addition to the converter in order overall to produce a converter voltage below the feedback reference voltage of the converter. To this end, the voltage reference circuit has a reference voltage external to the converter, which is connected to a feedback connector of the converter. The external reference voltage is greater than the internal feedback reference voltage. Then, the voltage reference circuit is configured and connected to the converter so that the converter voltage $V_{dd}$ arises as a difference between, firstly, the internal feedback reference voltage $V_{fb}$ and, secondly, the difference between external reference voltage $V_{ref}$ and internal reference voltage $V_{fb}$, weighted by a suitable resistance ratio R1/R2 of two resistors. Expressed differently: $V_{dd}=V_{fb}-R1\cdot(V_{ref}-V_{fb})/R2$. In particular, the two resistors form a voltage divider with two endpoints, to which, firstly, an output of the converter and, secondly, the external reference voltage are connected, and with a midpoint between the two resistors, to which the feedback connector is connected.

The switch of the switch-off circuit of the device is—as described above—preferably a transistor, specifically a MOSFET. In respect of the involved voltages, the latter is preferably configured as described below. Expediently, the maximum gate-source threshold voltage is as large as possible to avoid damage should the charging input voltage be too high, either unintentionally or in the case of a fault. By way of example, it is possible that the charging input voltage varies at the beginning of the charging and has not yet reached a stable state, or that there is a charging input voltage overshoot due to external interference. Fittingly, the maximum gate-source threshold voltage corresponds at least to the maximum possible charging input voltage. The gate-source threshold voltage, which in particular is also referred to as switch-on voltage, is also of importance. Expediently, the gate-source threshold voltage is less than the reset voltage in such a way that the device can transition into the state of discharge and, from there, into the off state. The greater the voltage range between minimum gate-source threshold voltage and reset voltage, the more different spatial arrangements (distance and angle of inclination) of device and charger relative to one another have an automatic switch-off available. Therefore, it is preferable for the gate-source threshold voltage to be as low as possible. For the automatic switch-off, the charging input voltage must drop to an intermediate voltage in the voltage range between minimum gate-source threshold voltage and reset voltage. The voltage range between minimum gate-source threshold voltage and reset voltage preferably has a width of at least 1 V. In summary, the following preferably applies: 1) minimum gate-source threshold voltage $V_{gs\text{-}thres}$<charging input voltage $V_{cc}$<reset voltage $V_{rst}$ and 2) reset voltage $V_{rst}$—maximum gate-source threshold voltage $V_{gs,max\_thres}\geq 1$ V.

Fittingly, the charger includes a control unit, to which the communications unit and the converter are connected. The converter is set by using the control unit, specifically on the basis of the data received by using the communications unit.

The charger expediently includes an emergency energy storage unit in order nevertheless to set the intermediate voltage when the energy supply to the charger is interrupted (cf. the scenarios above) and, in this respect, produce the switch-off signal, in particular, and consequently still prompt the device to transition into the off state. When the energy supply to the charger is interrupted, there spontaneously is no more energy available for operating the charger, and so the latter can no longer produce a switch-off signal for the device. However, by way of the emergency energy storage unit, an energy source is available a way from the regular energy supply by way of a cable or energy storage device, and the energy source, at least briefly, still provides enough energy for the production of the switch-off signal. In particular, the emergency energy storage unit is formed separately from an energy storage unit which is optionally present in the charger for charging the device. The emergency energy storage unit has correspondingly small dimensions. It is fitting for the emergency energy storage unit to be a battery or a supercapacitor.

Overall, an advantageous method is realized by the switch-off circuit in combination with the communications system, within the scope of which there is a wireless automatic switch-off of the device initiated by the charger, in particular specifically at the end of a charging process of the energy storage unit of the device and in general when an energy transfer from the charger to the device is interrupted. To this end, the method preferably includes one or more of the following steps, preferably in the specified sequence. In a first step, the device sends data to the charger, preferably recurrently. The data are analyzed in a second step, for example by the control unit. To the extent the data are modulated, these are initially demodulated in the second step, for example by using the above-described demodulator circuit. The converter is set on the basis of the data, in particular by the control unit, in a third step. By way of example, the control unit sets the converter using a DAC (digital analog converter) signal or a PWM (pulse width modulation) signal. In a fourth step, the converter subsequently outputs a converter voltage to the oscillator and controls the latter as a result. Likewise in the fourth step, the oscillator outputs a current used then to operate the transmitter coil. Consequently, the current is set indirectly by the converter in the fourth step. The transmitter coil produces a magnetic field on the basis of the current in a fifth step. The magnetic field is received in a sixth step by the reception coil, the latter producing a charging input voltage in the device on the basis thereof in such a way that, overall, the charger induces a charging input voltage in the device. Then, the device is switched off in a seventh step should the charging input voltage be in the voltage range between the reset voltage and the minimum gate-source threshold voltage, that is to say if the charging input voltage is an intermediate voltage as described above. Accordingly, the device transitions into the off state in the seventh step if an intermediate voltage is present, and is then switched off. In the seventh step, the device preferably only transitions into the off state after a time that is longer than a switching connector active time has additionally elapsed, as described above. Ultimately, the automatic switch-off is implemented on the basis of data transmitted to the charger by the device. In an advantageous eighth step, the converter is finally also deactivated, preferably after a certain period of time, for example 10 s, following the transition of the device into the off state. This prevents the converter from continuing to consume energy.

The description until now has considered the device being switched off once the charging has been completed. Then, the data contain at least the final charging input voltage, which is determined in conjunction with the final current and which is also used in combination therewith by the control unit, in particular, in order to determine a suitable converter voltage and then set the converter according to the explanations given above. However, other events than the completion of the charging process are likewise suitable, in principle, for initiating the automatic switch-off, for example if a temperature of the energy storage unit exceeds a limit temperature (overheating), if voltage or current at the energy storage unit exceed a corresponding limit (overvoltage/overcurrent), and generally in the case of a flaw of the energy storage unit (fault), or similar events. Then, the control unit infers one or more of these events when the control unit analyzes the data, and then controls the converter accordingly in order to initiate the automatic switch-off.

Other features which are considered as characteristic for the invention are set forth in the appended claims.

Although the invention is illustrated and described herein as embodied in a method for charging a device, a device and a charger, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
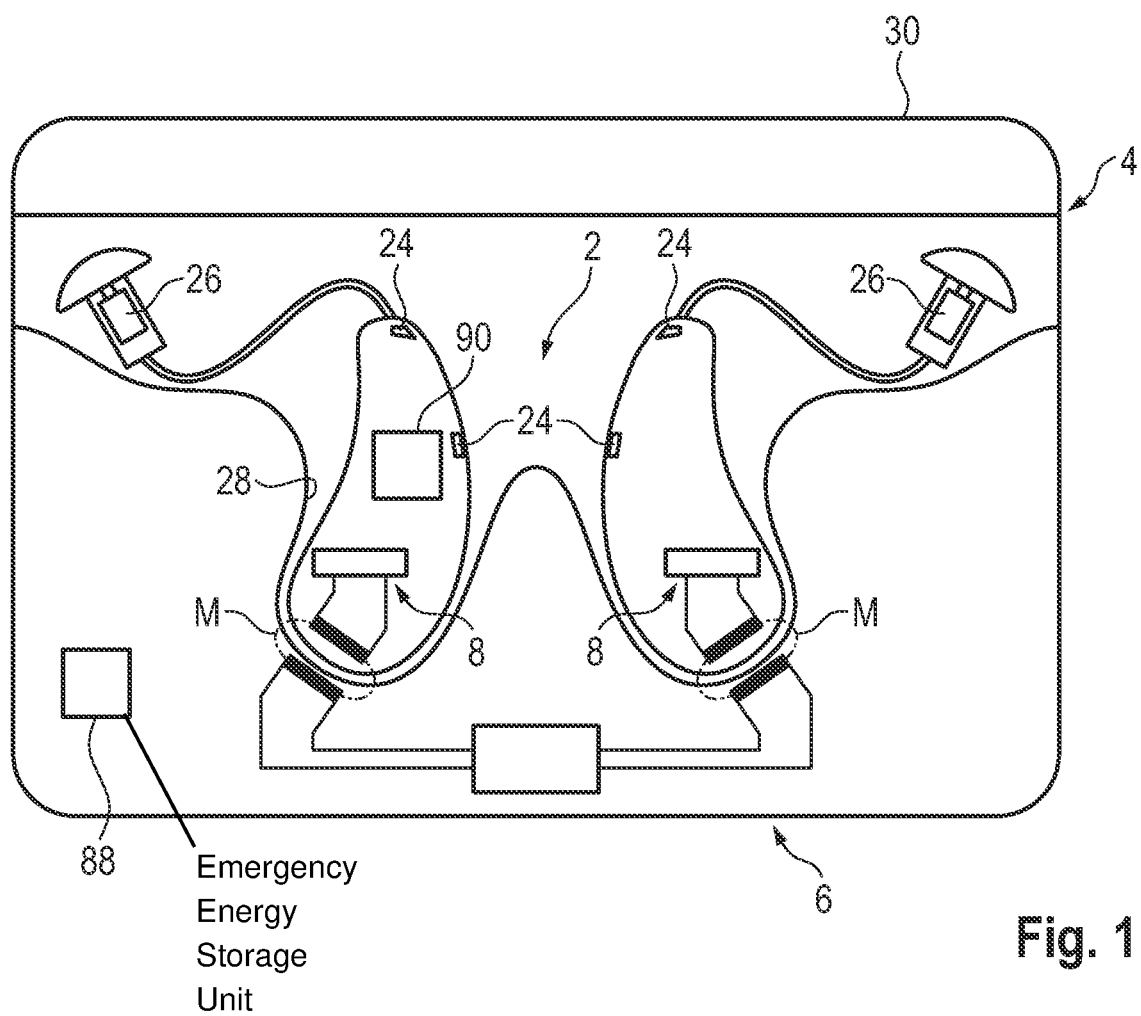
FIG. 1 is a longitudinal-sectional view of a device and a charger.
Figure 2:
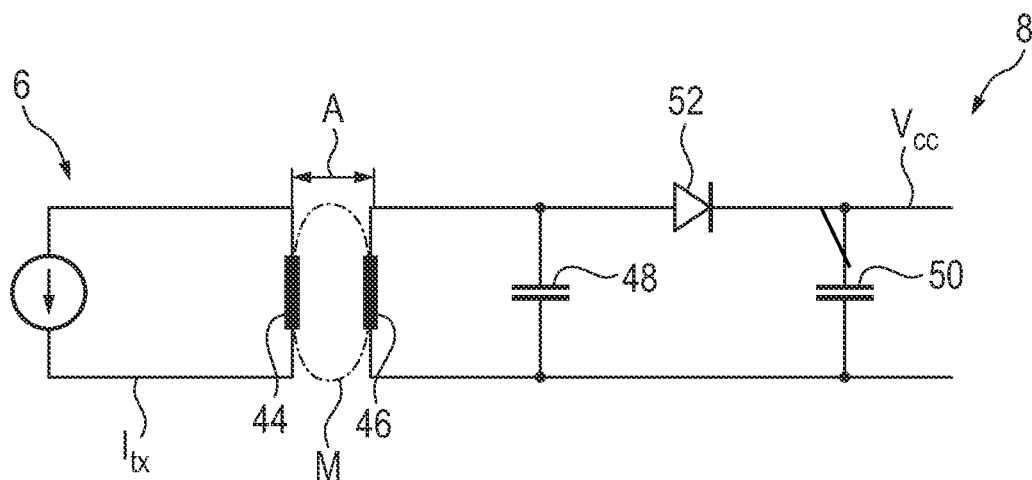
FIG. 2 is an equivalent circuit diagram of the device and the charger of FIG. 1.
Figure 3:
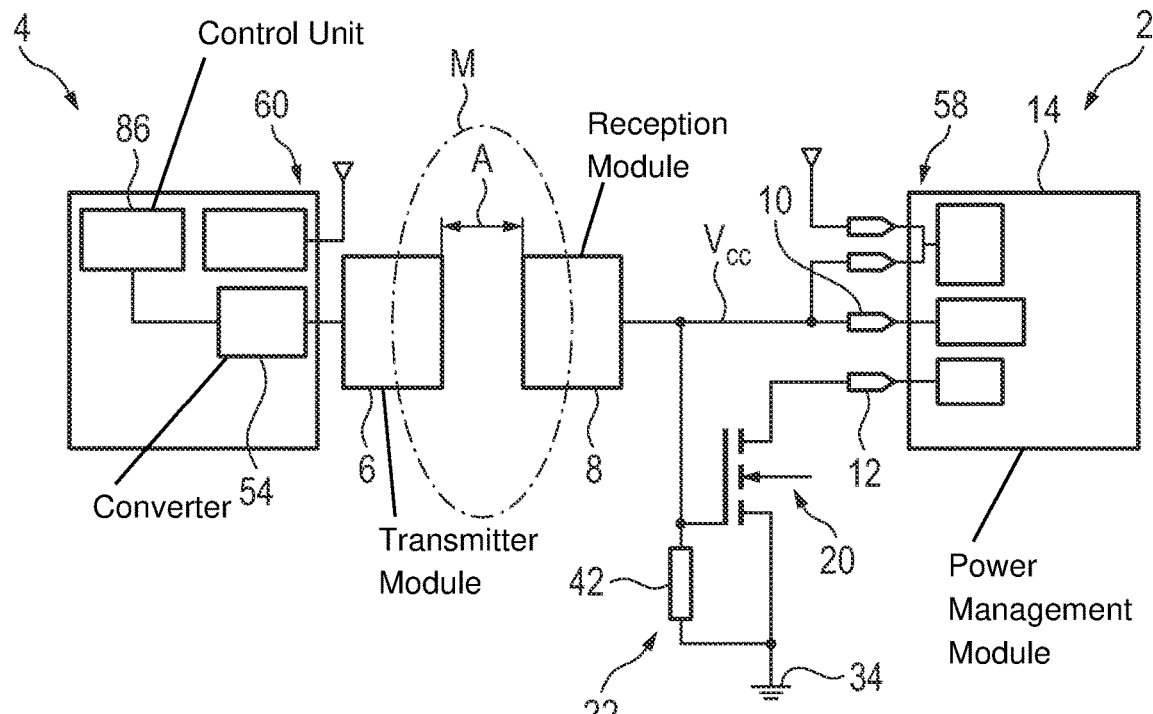
FIG. 3 is a block diagram of another representation of the device and the charger of FIG. 1.
Figure 4:
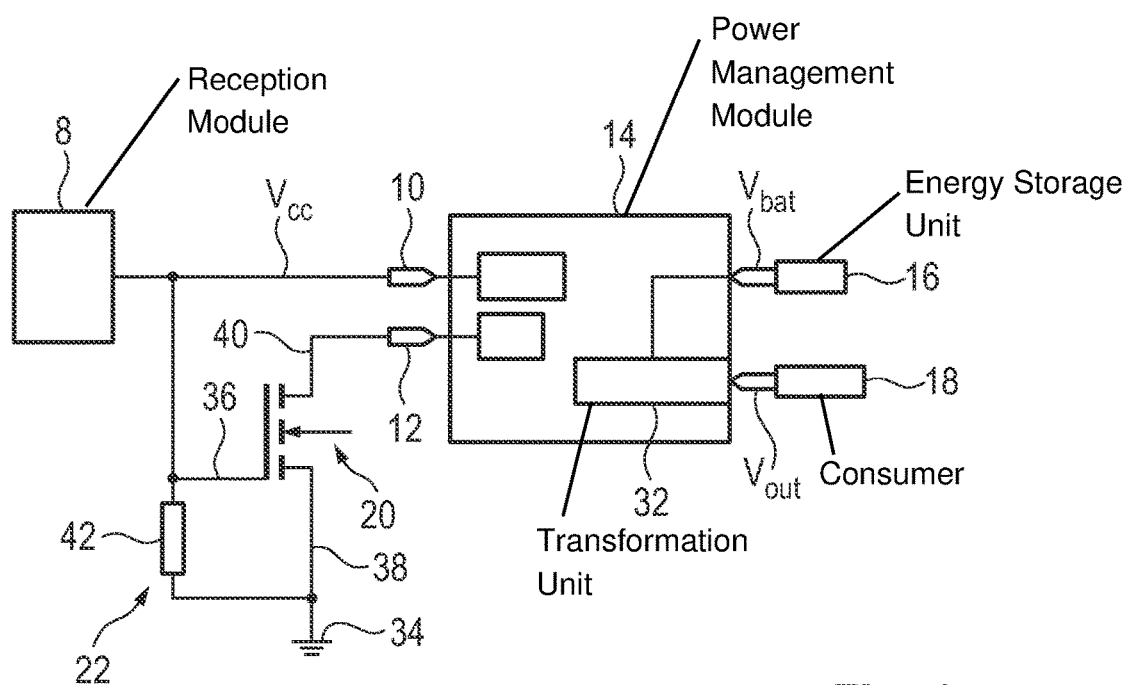
FIG. 4 is a block diagram of another representation of the device of FIG. 1.

Referring now to the figures of the drawings in detail and first, particularly, to FIG. 1 thereof, there is seen a device 2 and a charger 4, which are suitable for carrying out the method described herein. The device 2 is connected to the charger 4 and there is wireless charging in a state of charge LZ by virtue of energy being transferred wirelessly from a transmitter module 6 of the charger 4 to a reception module 8 of the device 2. By way of example, the device 2 in FIG. 1 is a binaural hearing aid having two individual devices, and so accordingly two reception modules 8 are present, which are supplied by the transmitter module 6 of the charger. FIG. 2 shows an equivalent circuit diagram for the device 2 and the charger 4, and FIG. 3 then shows another representation of the device 2 and the charger 4. Only the device 2 is shown in FIG. 4. FIGS. 2, 3, and 4 are simplified in relation to FIG. 1 to the effect of only one reception module 8 and only one transmitter module 6, that is to say only one of the individual devices, being shown. However, the following explanations apply in general, independently of the number of transmitter modules 6 and reception modules 8, that is to say, depending on the configuration of the device 2 and charger 4, one or more reception modules 8 may be present and there may also be one or more transmitter modules 6 independently thereof.

The device 2 is switched off during charging and is in the state of charge LZ. The device 2 includes a charging connector 10, to which a charging input voltage $V_{cc}$ that is adjustable by the charger 4 is applied for charging purposes. The device 2 further includes a switching connector 12, for turning the device on and off. In this case, the charging connector 10 and the switching connector 12 are connectors of a power management module 14 (also referred to as PMIC), which accepts the charging input voltage $V_{cc}$ and uses the latter to charge an energy storage unit 16 of the device 2.

The device 2 also has a state of discharge EZ in which energy is consumed, specifically by one or more consumers 18. In the state of discharge EZ, the power management module 14 controls the provision of energy for the consumers 18 from the energy storage unit 16. Consequently, the device 2 receives energy from the charger 4 in the state of charge LZ and the device 2 consumes the energy in the state of discharge EZ.

In this case, "the device 2 is switched on" is understood to mean that the consumers 18 are supplied with energy by using the power management module 14, and "the device 2 is switched off" then is understood to mean that the consumers 18 are not supplied with energy but equally the power management module 14 may still consume energy. As a matter of principle, the device 2 is also switched on in the state of discharge EZ. Provided the description below refers to the device 2 being "switched off," this is understood to mean that, firstly, the device 2 "is switched off" if it is switched on and, secondly, the device 2 "remains switched off" if it has already been switched off.

Moreover, the device 2 includes a switch 20 which is connected to the switching connector 12 and which is switchable by the charging input voltage $V_{cc}$ by virtue of the charging input voltage $V_{cc}$ being set to an intermediate voltage. The switch 20 is part of a switch-off circuit 22. The device 2 is now switched off by using the charger 4 by virtue of the latter setting the charging input voltage $V_{cc}$ to the intermediate voltage in such a way that the switch 20 is switched and the device 2 transitions into an off state AZ. Thus, the charger 4 sets the intermediate voltage, whereupon the device 2 transitions into the off state AZ. This is implemented, for example, when the charging is terminated or interrupted but in principle may also occur generally in the case of a fault, for example should the energy storage unit 16 overheat or have an overvoltage/overcurrent. Hence, an automatic switch off is realized by way of the charger 4 as soon as energy is no longer transferred to the device 2. Hence, the charger 4 initiates the transition of the device 2 into the off state AZ in which the device 2—unlike in the state of discharge EZ—no longer consumes any energy. In this case, the charger 4 uses the option of variably setting the charging input voltage $V_{cc}$.

The device 2 shown herein only in exemplary fashion is a hearing aid which is used to provide for a user who has a hearing deficiency. To this end, the hearing aid includes a microphone 24 (in this case two microphones 24 for each individual device) which captures sound from the environment and generates an electrical input signal. For modification purposes, this is supplied to a signal processor not explicitly shown, which outputs as a result an electrical output signal, which is then converted back into sound and output to the user through a receiver 26 of the hearing aid. Instead of the microphone 24 and the receiver 26, other input and/or output transducers are also possible depending on the type of hearing aid. In this case, the hearing aid has a binaural form, but it could alternatively be monaural. The microphones 24, the receivers 26 and the signal processors are each consumers 18 of the device 2. Alternatively, the device 2 is a headphone, a headset, a wearable, a smartphone, or the like.

For charging, the device 2 is connected to the charger 4 and placed into the latter to this end, for example as shown in FIG. 1. To this end, the charger 4 shown herein is in the form of a charging tray with a depression 28 into which the device 2 is placeable. The charger 4 optionally has a lid 30. Expediently, the depression is shaped so that the device is held therein in an arrangement relative to the charging tray that is as defined as possible.

Depending on the charging level of the energy storage unit 16, the latter provides a voltage $V_{bat}$ for the consumers 18, that voltage optionally still being transformed by a transformation unit 32 in advance. The higher the charging level, the higher this voltage $V_{bat}$ typically is. The device 2 is charged by the charger 4 with a charging input voltage $V_{cc}$, which is the voltage present in the device 2 for charging the energy storage unit 16. Then, the energy storage unit 15 is charged until the desired charging level or voltage $V_{bat}$ has been reached. A charging threshold voltage $V_{chg,thres}$ is specified to this end, the latter being compared to the charging input voltage $V_{cc}$ in order to define when there is charging, and when not. In the present case, the charging is completed once the charging input voltage $V_{cc}$ drops below the charging threshold voltage $V_{chg,thres}$. By way of example, the charging threshold voltage $V_{chg,thres}$ is a fixed voltage.

Although the automatic switch-off is carried out by the device 2 itself in the present case, it does not initiate this itself; instead, this is initiated by the charger 4 which determines when the device 2 should be switched off and which then transmits a switch-off signal to the device 2 in such a way that the latter is switched off. The switch-off signal leads to the intermediate voltage being present in the device 2.

It is desirable in general for the device 2 to be switched off after charging, for as long as the device still is connected to the charger 4. When the state of charge LZ is completed, the device 2 should not where possible transition into the state of discharge EZ and hence remain switched on; instead, the device 2 should be switched off.

In order to realize the automatic switch-off and thereby switch the device 2 off after charging, use is made of the charging connector 10 of the power management module 14. The charging input voltage $V_{cc}$ is applied to the charging connector 10. In an embodiment not explicitly shown, the switching connector 12 is pulled up using a pull-up resistor and a manually actuatable switch for manually switching the device 2 off is connected between the switching connector and ground 34. Independently thereof or suitably combined therewith, the device 2 includes the aforementioned switch-off circuit 22 with the switch 20 for the automatic switch-off by using the charger 4, the switch-off circuit using the charging connector 10 and the switching connector 12 in analogous fashion. In this case, the switch 20 is a transistor, specifically a MOSFET, having gate 36, source 38, and drain 40, that is to say with appropriate connectors. The gate 36 is connected to the charging connector 10 and pulled up to the charging input voltage $V_{cc}$ using a resistor 42. The resistor 42 connects the gate 36 to the source 38 and to ground 34. The drain 40 and the source 38 are connected to the switching connector 12 and to ground 24, respectively.

In the off state AZ now realized, the device 2 is connected to the charger 4 but switched off in the process and neither consumes energy itself nor receives energy from the charger 4. By contrast, the device 2 is switched off in the state of charge LZ, but still receives energy for operating the power management module 14, and is switched on and consumes energy in the state of discharge EZ. In order to switch between the state of charge LZ and the state of discharge EZ (in both directions), the device 2 still has an idle state WZ in the exemplary embodiment shown, and so a total of four operating states AZ, EZ, LZ, WZ are possible, which also preclude one another.

Figure 5:
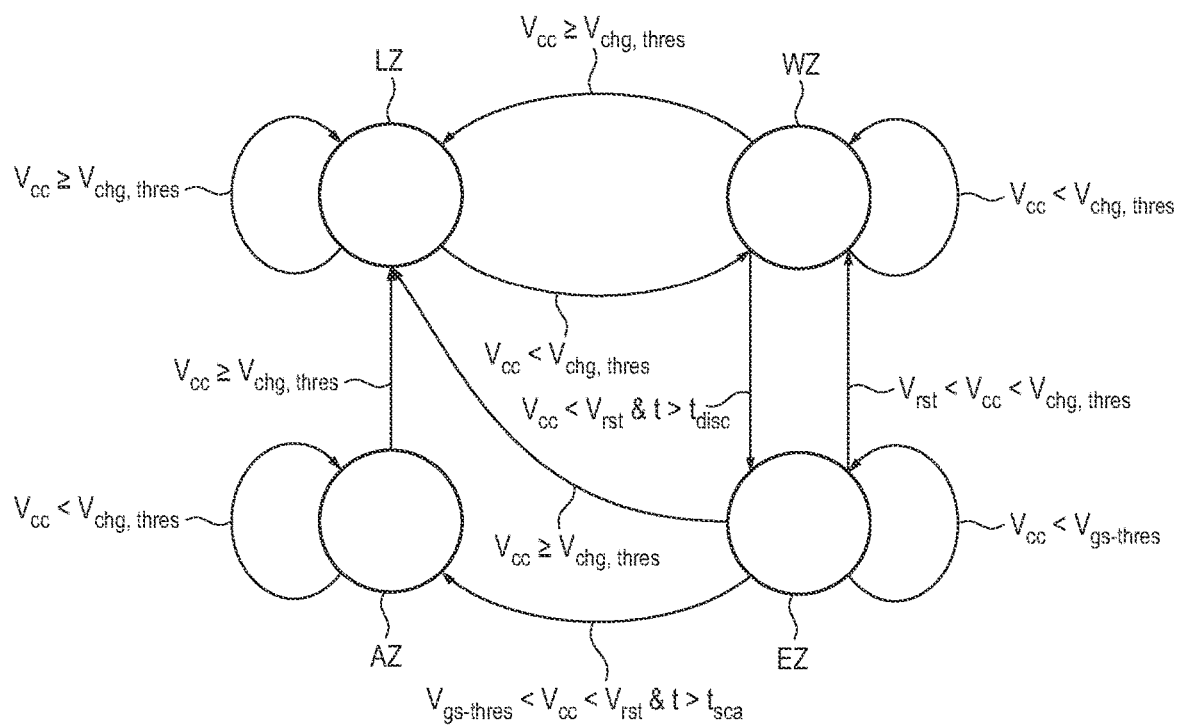
FIG. 5 is a diagram showing four operating states of the device of FIG. 1.

An exemplary dependence of the operating states AZ, EZ, LZ, WZ is shown in FIG. 5. The device 2 transitions into the state of charge LZ from the state of discharge EZ, from the off state AZ or from the idle state WZ if the charging input voltage $V_{cc}$ at least corresponds to the charging threshold voltage $V_{chg,thres}$. The state of charge LZ remains active for as long as the charging input voltage $V_{cc}$ at least corresponds to the charging threshold voltage $V_{chg,thres}$. The device 2 transitions from the state of charge LZ into the idle state WZ once the charging input voltage $V_{cc}$ is less than the charging threshold voltage $V_{chg,thres}$. The device 2 transitions from the idle state WZ into the state of discharge EZ once the charging input voltage $V_{cc}$ is less than a reset voltage $V_{rst}$ and additionally in this case once a time that is longer than a discharge time $t_{disc}$ has also elapsed. In this case, the reset voltage $V_{rst}$ is fixed voltage and a parameter of the power management module 14, and serves to stop the operation of the latter and initialize the latter with a predefined standard state. In the present case, the reset voltage $V_{rst}$ is also used to define when the transition from the idle state WZ to the state of discharge EZ occurs. By way of example, the discharge time $t_{disc}$ is a fixed time of a few seconds. Conversely, the device 2 transitions from the state of discharge EZ into the idle state WZ if the charging input voltage $V_{cc}$ is less than the charging threshold voltage $V_{chg,thres}$ and greater than the reset voltage $V_{rst}$, and transitions from the idle state WZ to the state of charge LZ if the charging input voltage $V_{cc}$ at least corresponds to the charging threshold voltage $V_{chg,thres}$. The idle state WZ remains active for as long as the charging input voltage $V_{cc}$ is less than the charging threshold voltage $V_{chg,thres}$.

The automatic switch off, that is to say a transition into the off state AZ, is realized by virtue of the charging input voltage $V_{cc}$ at the charging connector 10 being set to an intermediate voltage which is a gate-source threshold voltage $V_{gs\text{-}thres}$ of the transistor and lies between the reset voltage $V_{rst}$ and a minimum gate-source threshold voltage $V_{gs\text{-}thres,min}$, that is to say a minimum value for the gate-source threshold voltage $V_{gs\text{-}thres}$. The gate-source threshold voltage $V_{gs\text{-}thres}$ is the voltage required to switch the transistor and is in a range between the minimum gate-source threshold voltage $V_{gs\text{-}thres,min}$ and a maximum gate-source threshold voltage $V_{gs\text{-}thres,max}$. The reset voltage $V_{rst}$ is greater than the actually used gate-source threshold voltage $V_{gs\text{-}thres}$ but the maximum gate-source threshold voltage $V_{gs\text{-}thres,max}$ may be greater than the reset voltage $V_{rst}$.

Now, a voltage range used to transition into the off state AZ is spanned for the intermediate voltage between, firstly, the minimum gate-source threshold voltage $V_{gs\text{-}thres,min}$ and, secondly, the reset voltage $V_{rst}$. If the charging input voltage $V_{cc}$ is less than the reset voltage $V_{rst}$, the device 2 transitions into the state of discharge EZ. In principle, the state of discharge EZ initially is active for as long as the charging input voltage $V_{cc}$ is less than the minimum gate-source threshold voltage $V_{gs\text{-}thres,min}$. The device 2 transitions into the off state AZ once the charging input voltage $V_{cc}$ is less than the reset voltage $V_{rst}$ and greater than the charging threshold voltage $V_{chg,thres}$ and additionally in this case once a time (during which the intermediate voltage is held) that is longer than a switching connector active time $t_{sca}$ has elapsed. Accordingly, as soon as the intermediate voltage has been reached at the gate 36, the transistor is switched and the switching connector 12 is pulled to ground 34. The device 2 transitions briefly into the state of discharge EZ and, from there, into the off state AZ after the switching connector active time $t_{sca}$ has elapsed. By way of example, the switching connector active time $t_{sca}$ is a fixed time of, e.g., a few seconds. In the present case, a transition into the off state AZ is only possible proceeding from the state of discharge EZ.

A switch-on of the device 2 and, specifically, a transition from the off state AZ into the state of discharge EZ is possible initially through the state of charge LZ. In the embodiment shown herein, the device 2 transitions from the off state AZ into the state of charge LZ if the charging input voltage $V_{cc}$ at least corresponds to the charging threshold voltage $V_{chg,thres}$. Alternatively or in addition, a transition from the off state AZ is possible by way of a manual switch-on of the device 2 by the user. To this end, the device 2 includes a switch (e.g., as already described further above) that is not explicitly shown herein.

The described solution for the automatic switch-off of the device 2 is readily possible in the case of connected-by-contact charging since there is a conductive connection in this case, through the use of which the intermediate voltage can easily be set. However, in the case of a charger 4 for wireless charging as described herein this is not readily possible since the charging input voltage $V_{cc}$ is not provided directly by the charger 4, but merely induced in the device 2 thereby by using the transmitter module 6, and consequently is not necessarily present in the charger 4 itself.

As is evident in FIG. 2, there is an energy transfer during charging by using a magnetic field M which is produced using a transmitter coil 44 of the transmitter module 6 and which is received by a reception coil 46 of the reception module 8. In order to then set the charging input voltage $V_{cc}$ to the intermediate voltage in the case of a wireless charger 4, the transmitter module 6 is accordingly controlled in such a way that the intermediate voltage is induced in the device 2. The magnetic field M otherwise used for charging purposes consequently simultaneously represents the switch-off signal, which is transmitted from the charger 4 to the device 2, when actuated accordingly.

Together, the charger 4 and the device 2 for wireless charging form a wireless charging system. The reception module 8 provides the charging input voltage $V_{cc}$ and outputs the latter to the power management module 14. In general, the transmitter coil 44 in the transmitter module 6 is operated using a power source of the charger 4. Moreover, the reception module 8 includes wiring for the reception coil 46 in order to produce the charging input voltage $V_{cc}$. In this case, the wiring includes a tuning capacitor 48, a smoothing capacitor 50 and a Schottky diode 52.

The charging input voltage $V_{cc}$ depends on a multiplicity of parameters, in particular on the current $I_{tx}$ to the transmitter coil 44, the respective inductance of the transmitter coil $L_{tx}$ and of the reception coil $L_{rx}$, a transfer frequency f, which is used for the transfer of energy by using the magnetic field M, and a coupling factor k. The coupling factor k in turn depends, in particular, on the distance A and on the angle of inclination between the transmitter coil 44 and the reception coil 46, that is to say in general on the spatial arrangement of the charger 4 and the device 2 during charging. The smaller the distance A and the smaller the angle of inclination, the greater the coupling factor k. In general, the following applies to the charging input voltage $V_{cc}$: $V_{cc} \propto 2\pi \cdot f \cdot k \cdot \sqrt{(L_{tx} \cdot L_{rx})} \cdot I_{tx}$.

Figure 6:
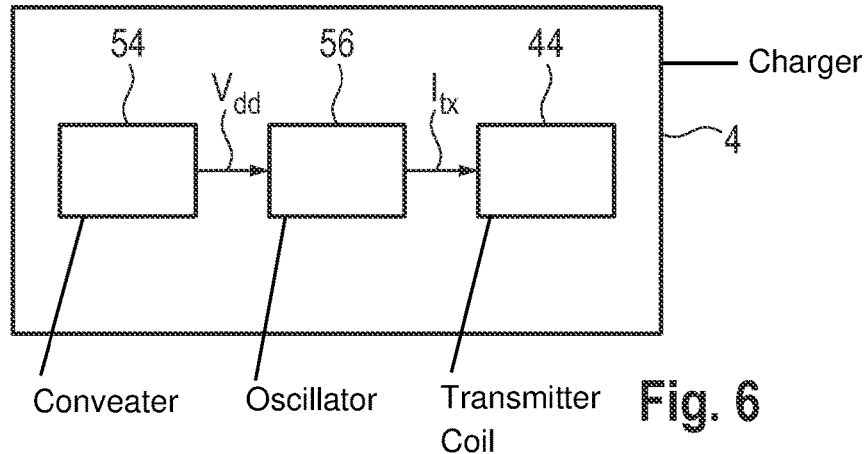
FIG. 6 is a block diagram of another representation of the charger of FIG. 1.

For the wireless energy transfer, the charger 4 still includes a converter 54 and an oscillator 56. This is shown in detail in FIG. 6. The oscillator 56 produces the current $I_{tx}$ for operating the transmitter coil 44 and accordingly is a power source. Then, the transmitter coil 44 and the oscillator 56 form the transmitter module 6. The converter 54 produces a converter voltage $V_{dd}$ for operating the oscillator 56. Consequently, the converter 54 influences the current $I_{tx}$ with which the transmitter coil 44 is operated. The charging input voltage $V_{cc}$ and hence also the intermediate voltage is thus set by using the converter voltage $V_{dd}$.

For fixed values of the inductances $L_{tx}$, $L_{rx}$ of transmitter coil 44 and reception coil 46 and of the transfer frequency f, the charging input voltage $V_{cc}$ increases with increasing coupling factor k and, at the same time, with increasing current $I_{tx}$ to the transmitter coil 44. These two relationships, specifically between charging input voltage $V_{cc}$ and coupling factor k on the one hand and between charging input voltage $V_{cc}$ and current $I_{tx}$ on the other hand, are used in the present case, given a known coupling factor k, to control the charging input voltage $V_{cc}$ by using the current $I_{tx}$, and hence to activate the off state AZ in a targeted manner. The off state AZ of the device 2 is then activated externally by the charger 4 by way of a suitable control of the converter 54 and an adjustment of its converter voltage $V_{dd}$. As described above, the relationship between converter voltage $V_{dd}$ and charging input voltage $V_{cc}$ is given by $V_{cc} \propto 2\pi \cdot f \cdot k \cdot \sqrt{(L_{tx} \cdot L_{rx})} \cdot I_{tx}$, with the current $I_{tx}$, as described, being a function of the converter voltage $V_{dd}$.

The converter voltage $V_{dd}$ which should be set to produce a certain charging input voltage $V_{cc}$ and the intermediate voltage depends on the coupling factor K and can therefore vary as a matter of principle. By contrast, the inductances $L_{tx}$, $L_{rx}$ and the transfer frequency f are known for a given combination of device 2 and charger 4. Now, for the purposes of producing the intermediate voltage, the converter voltage $V_{dd}$, and hence also the current $I_{tx}$, is set in the present case by virtue of initially determining the coupling factor K and then using the latter to determine the converter voltage $V_{dd}$ that is required to produce the intermediate voltage. This is illustrated in FIGS. 7 and 8, and implemented on the basis of the relationship between charging input voltage $V_{cc}$ and converter voltage $V_{dd}$, specifically $V_{cc} \propto 2\pi \cdot f \cdot k \cdot \sqrt{(L_{tx} \cdot L_{rx})} \cdot I_{tx}(V_{dd})$.

Figure 7:
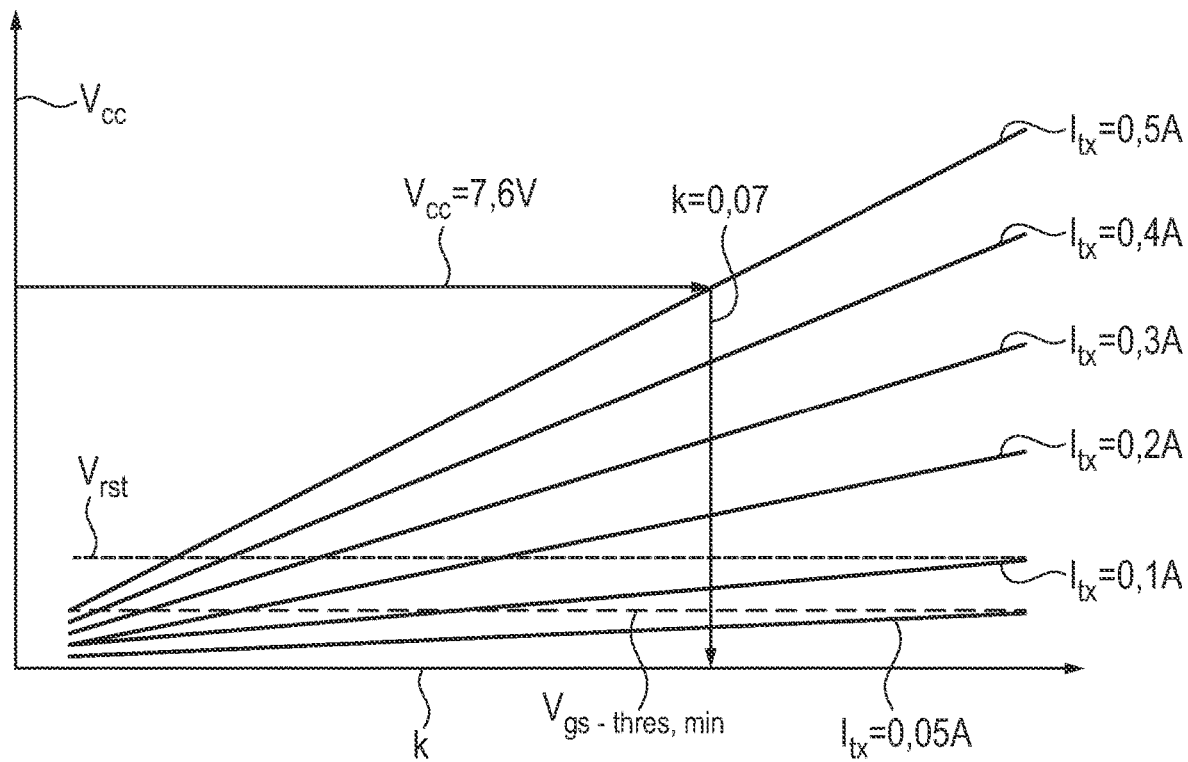
FIG. 7 is a diagram showing the charging input voltage as a function of the coupling factor.
Figure 8:
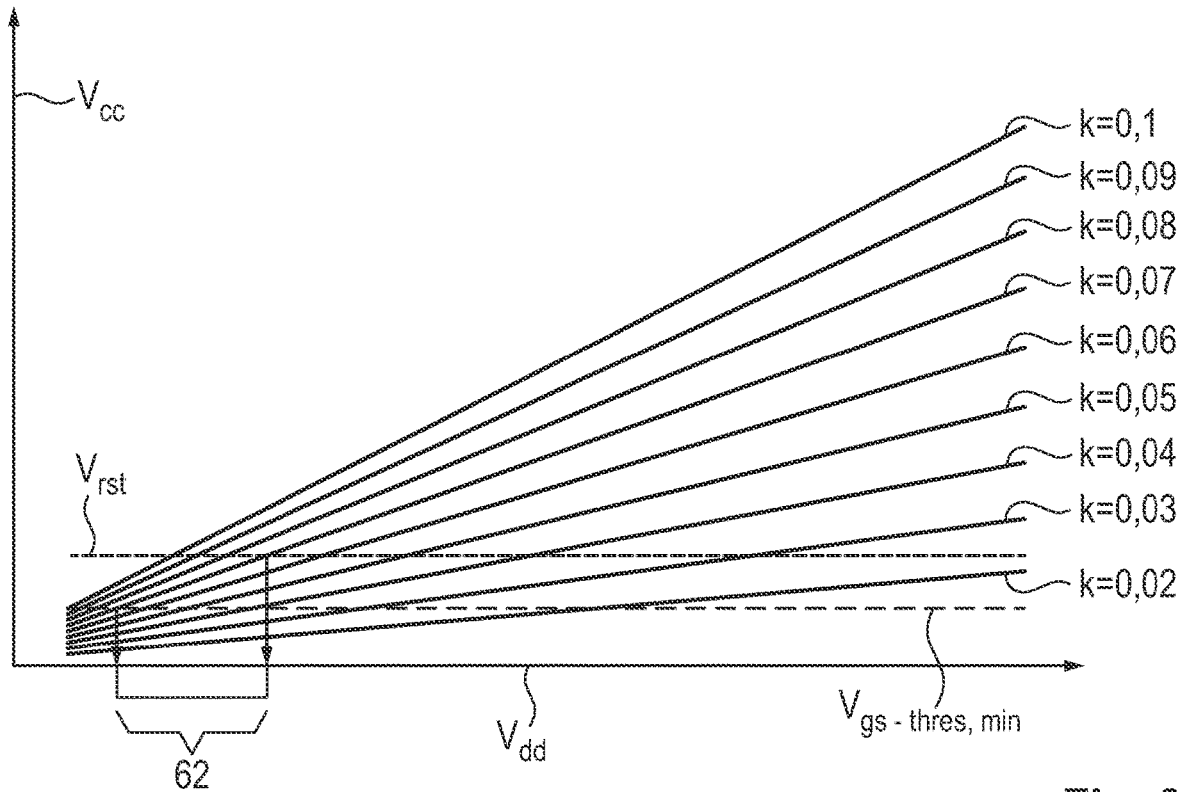
FIG. 8 is a diagram showing the charging input voltage as a function of the converter voltage.

As shown in FIG. 7, the coupling factor k is determined by way of the relationship between the charging input voltage $V_{cc}$ and the current $I_{tx}$/converter voltage $V_{dd}$, to be precise using a known pair of values for the charging input voltage $V_{cc}$ and the current $I_{tx}$. Since the charging input voltage $V_{cc}$ is not known to the charger 4, there is communication between the charger 4 and the device 2 for determining the coupling factor k. At the end of the charging process, the device 2 transmits to the charger 4 the last charging input voltage $V_{cc}$ (more precisely: its value) applied during the charging. This last-applied charging input voltage $V_{cc}$ is also referred to as "final charging input voltage" $V_{cc}$. Moreover, the charger 4 stores the current $I_{tx}$ (more precisely: its value) that is used to operate the transmitter coil 44 at the time of the final charging input voltage $V_{cc}$, that is to say the last current $I_{tx}$ applied still during charging, which is analogously referred to as final current $I_{tx}$. The final charging input voltage $V_{cc}$ is transmitted through a data connection between the device 2 and the charger 4. To this end, the device 2 and the charger 4 each have a communications unit 58, 60, for example an antenna and a suitable circuit for the antenna, for transmitting and/or receiving data, specifically the final charging input voltage $V_{cc}$. The charger 4 receives the final charging input voltage $V_{cc}$, whereupon the coupling factor k is determined in combination with the final current $I_{tx}$, specifically by way of the specified relationship and, for example, as shown in FIG. 7.

Then, the converter voltage $V_{dd}$ of the converter 54 is determined using the intended intermediate voltage and the coupling factor k. Since the intermediate voltage is in a voltage range between the reset voltage $V_{rst}$ and the minimum gate-source threshold voltage $V_{gs\text{-}thres,min}$, a suitable voltage range 62 then also arises accordingly, as shown in FIG. 8, for the converter voltage $V_{dd}$, from which voltage range the latter then is chosen, for example simply as the mid-value of the voltage range 62.

Figure 9:
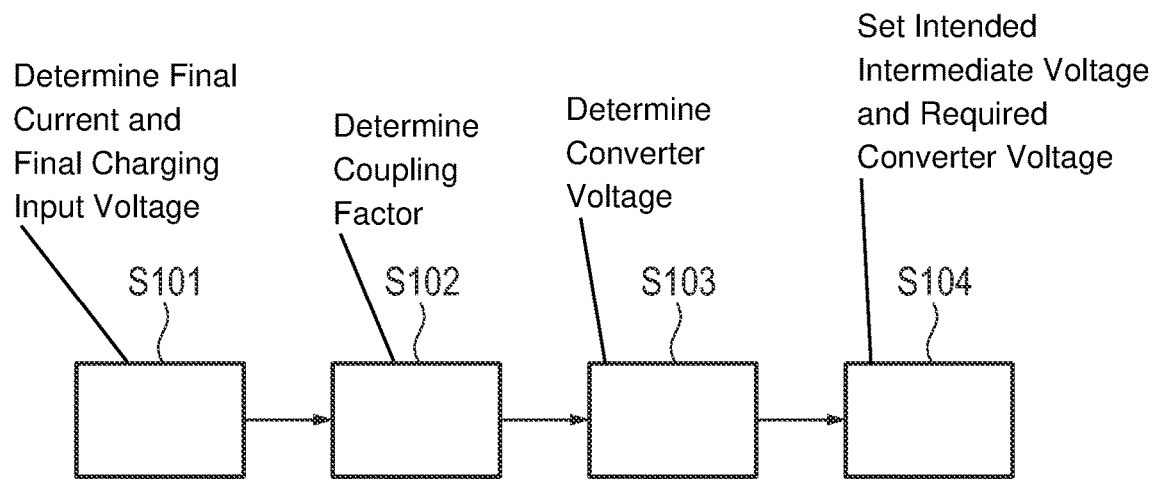
FIG. 9 is a flow chart showing four steps of a method.

In summary, setting of the converter voltage $V_{dd}$ described herein consequently includes the four steps S101-S104 shown in FIG. 9: A final current $I_{tx}$ and a final charging input voltage $V_{cc}$ are determined in a first step S101. Subsequently, the coupling factor k is determined on the basis of the final current $I_{st}$ and the final charging input voltage $V_{cc}$ in a second step S102. The converter voltage $V_{dd}$ required to this end is subsequently determined in a third step S103 using the coupling factor k and the intended intermediate voltage, and the required converter voltage is finally set in a fourth step S104.

The relationship used in each case for determining the coupling factor k and the converter voltage $V_{dd}$ is for example stored in each case as a parameterized functional bundle, as shown in FIGS. 7 and 8. In order to determine the coupling factor k, the charging input voltage $V_{cc}$ is for example stored as a function of the coupling factor k and parameterized by the current $I_{tx}$, as shown in FIG. 7, in such a way that a corresponding functional bundle arises. In order to determine the converter voltage $V_{dd}$, the charging input voltage $V_{cc}$ is for example stored as a function of the converter voltage $V_{dd}$ and parameterized by the coupling factor k, as shown in FIG. 8, in such a way that a corresponding functional bundle arises.

In the example of FIG. 7, the final charging input voltage $V_{cc}$ is 7.6 V and the associated final current $I_{tx}$ is 0.5 A. The coupling factor k is determined to be k=0.07 on the basis of these values and in conjunction with the inductances $L_{tx}$, $L_{rx}$ and the transfer frequency f. The reset voltage $V_{rst}$ is 2 V and the minimum gate-source threshold voltage $V_{gs\text{-}thres,min}$ is 1 V; then a voltage range of 1 V to 2 V arises for the intended intermediate voltage. According to the example in FIG. 8, a converter voltage $V_{dd}$ in the range of 0.125 V to 0.275 V is then determined for this intermediate voltage using the coupling factor of k=0.07. Then, the converter voltage $V_{dd}$ is set to 0.2 V, for example, in such a way that the corresponding intermediate voltage arises in the device 2 and the device 2 transitions into the off state AZ.

The gate-source threshold voltage $V_{gs\text{-}thres}$ must, at least in certain regions, be smaller than the reset voltage $V_{rst}$. For the aforementioned reset voltage $V_{rst}$ of 2 V, a suitable transistor therefore has a minimum gate-source threshold voltage $V_{gs\text{-}thres,min}$ of less than 2 V, for example 1.4 V or 0.7 V.

Figure 10:
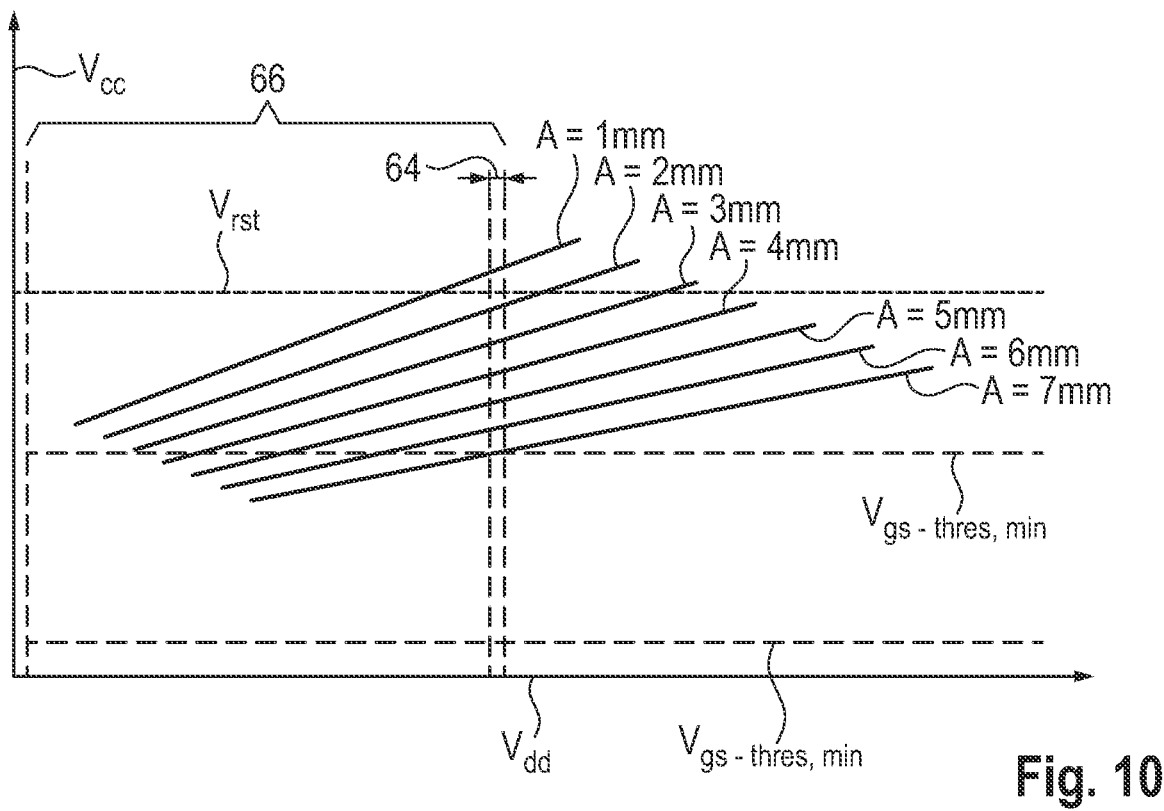
FIG. 10 is a diagram showing the charging input voltage as a function of the converter voltage for two different transistors.

For all distances A, the reset voltage $V_{rst}$ defines an upper limit for the converter voltage $V_{dd}$ (reference is made in this case to distance A for simplicity; however, the explanations apply in general to the coupling constant k). In the case of the aforementioned reset voltage $V_{rst}$ of 2 V, the upper limit for the converter voltage $V_{dd}$ is 0.69 V, for example. Should it not be possible to maintain the latter, an automatic switch-off may not be possible for some distances A under certain circumstances. This is illustrated in FIG. 10. By way of example, the distance A for charging purposes is between 1 mm and 10 mm (FIG. 10 plots the charging input voltage $V_{cc}$ as a function of the converter voltage $V_{dd}$ for different distances A from 1 mm to 7 mm in 1 mm steps). In order to facilitate an automatic switch-off for all distances A, the charging input voltage $V_{cc}$ must be above the gate-source threshold voltage $V_{gs\text{-}thres}$ for each distance A. Automatic switch-off is not possible for those distances A that do not satisfy this condition. From this, it is evident that a transistor with a minimum gate-source threshold voltage $V_{gs\text{-}thres,min}$ that is as low as possible facilitates an automatic switch-off for a significantly larger range of distances A. In the aforementioned example with a transistor which has a minimum gate-source threshold voltage $V_{gs\text{-}thres,min}$ of 0.685 V, the voltage range 64 available to the converter voltage $V_{dd}$ for producing a suitable intermediate voltage for automatic switch-off at all distances A is only 0.005 V. Then, a lower converter voltage $V_{dd}$ possibly no longer suffices for an automatic switch-off at a distance A of 5 mm or more. Using another transistor which has a minimum gate-source threshold voltage $V_{gs\text{-}thres,min}$ of 0.5 V, the voltage range 66 available to the converter voltage $V_{dd}$ for producing a suitable intermediate voltage for the automatic switch-off at all distances A is approximately 0.2 V. Hence, an automatic switch-off is possible without problems over the entire range from 1 mm to 10 mm.

Figure 11:
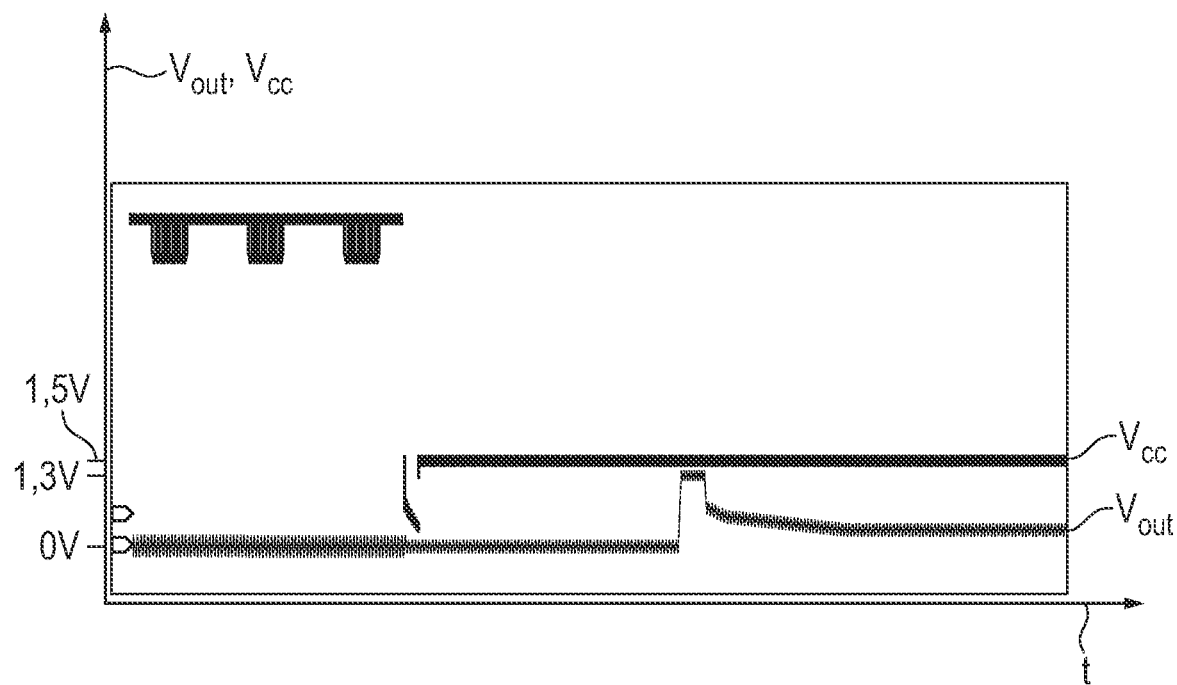
FIG. 11 is a diagram showing the charging input voltage and the voltage for consumers of the device as a function of time.
Figure 12:
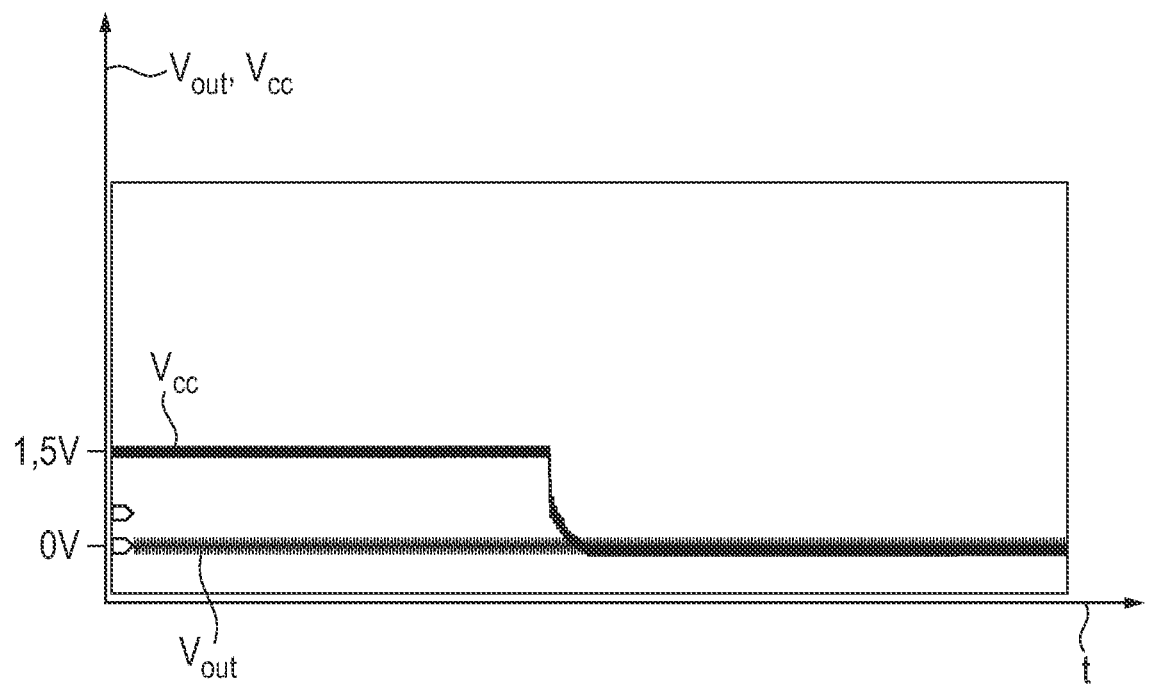
FIG. 12 is a diagram showing the voltages of FIG. 11 at a comparatively later time.

FIGS. 11 and 12 each show an oscilloscope measurement in an exemplary application. In this case, the charging input voltage $V_{cc}$ and the voltage $V_{out}$ output by the power management module 14 to the consumers 18 are each plotted as a function of time t. The distance A between transmitter coil 44 and reception coil 46 is 4 mm in this case. The device 2 initially transitions into the state of charge LZ and is charged. Then, as shown in FIG. 11, the converter voltage $V_{dd}$ of the converter 54 is set to 0.6 V for the automatic switch-off. Hence, the charging input voltage $V_{cc}$ in the device 2 is set to an intermediate voltage of 1.5 V. The device 2 initially transitions into the state of discharge EZ and starts to consume energy a few seconds later, for the purposes of which the power management module 14 provides a voltage $V_{out}$ of, e.g., 1.3 V for the consumers 18. Then, the device 2 transitions into the off state AZ, which then is active in FIG. 12. After a few seconds (e.g. s), the converter voltage $V_{dd}$ is set to 0 V in order to deactivate the converter 54 so that the charging input voltage $V_{cc}$ then is 0 V, as shown in FIG. 12. Now, the charger 4 can be switched off overall and separated from the device 2, with the device 2 then remaining in the off state AZ without returning to the state of discharge EZ even though the charging input voltage $V_{cc}$ is 0 V in that case.

Figure 13:
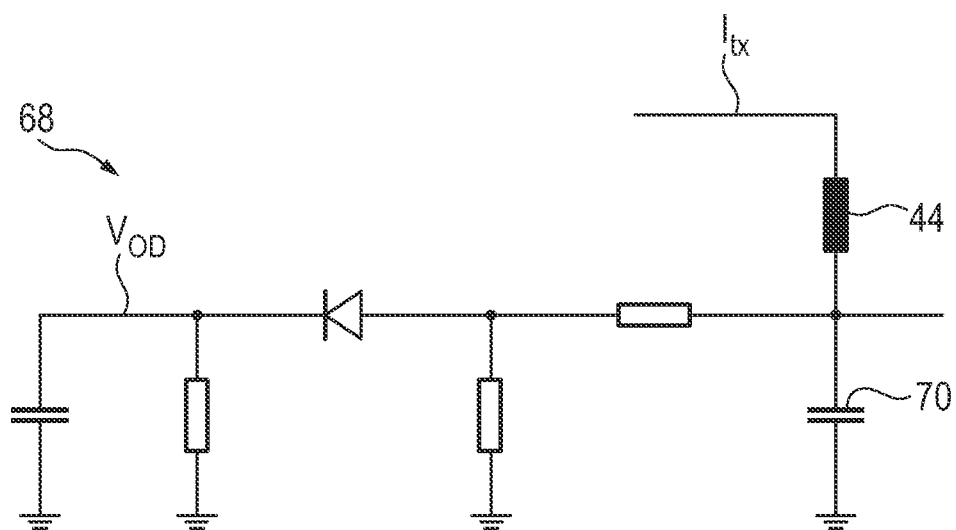
FIG. 13 is a demodulator circuit of the charger of FIG. 1.

As already described, the device 2 and the charger 4 each have a respective communications unit 58, 60, for the interchange of data. With the communications unit 58 of the device 2, the communications unit 60 of the charger 4 forms a communications system for data interchange. In the present case, the communications system serves to transmit data in relation to the charging input voltage $V_{cc}$ from the device 2 to the charger 4. Accordingly, the communications system can have a bidirectional configuration or only be monodirectional from the device 2 to the charger 4. In this case, the communications system is wireless and uses an appropriate communications protocol, for example magnetic induction. In the present case, the data are modulated by the device 2 for transfer purposes. The transferred data are, for example, the state of charge (SOC), current voltage, current charging current, temperature, the above-described charging input voltage $V_{cc}$ of the energy storage unit 16 or a combination thereof. The charger 4 receives and demodulates the data. To this end, the charger 4 includes a demodulator circuit 68, for example as shown in FIG. 13. The demodulator circuit 68 shown there is also used to determine the current $I_{tx}$ in the transmitter module 6, more precisely the current $I_{tx}$ through the transmitter coil 44, which is integrated in the demodulator circuit 68 to this end. To this end, the demodulator circuit 68 includes a capacitor 70, at which the current $I_{tx}$ emerges as a ratio of a maximum object detection voltage $V_{OD}$ of the demodulator circuit 68 and its impedance at the transfer frequency f of the transmitter coil 44.

Figure 14:
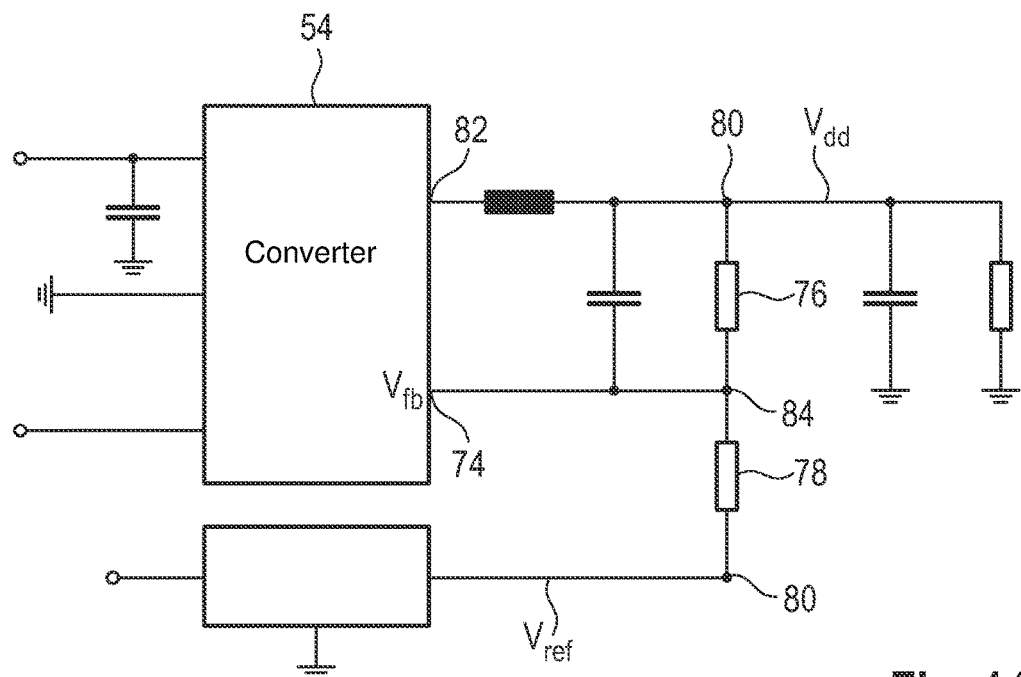
FIG. 14 is a voltage reference circuit of the charger of FIG. 1.

In the case of a connected-by-contact automatic switch-off, the converter 54 outputs a voltage between the reset voltage $V_{rst}$ and the minimum gate-source threshold voltage $V_{gs\text{-}thres,min}$ as converter voltage $V_{dd}$ in order to switch the device 2 off. However, this voltage range for the converter voltage $V_{dd}$ is not necessarily applicable to the wireless automatic switch-off since a lower converter voltage $V_{dd}$ is required for the switch-off in this case. In the case of the wireless automatic switch-off, the converter voltage $V_{dd}$ of the converter 54 is an input voltage for the oscillator 56 which amplifies the converter voltage $V_{dd}$ in such a way that, ultimately, an appropriate greater charging input voltage $V_{cc}$ arises in the device 2, especially if the reception coil 46 has more turns than the transmitter coil 44. Therefore, the converter voltage $V_{dd}$ is substantially lower in the case of the wireless automatic switch-off than in the case of the connected-by-contact automatic switch-off, and is of the order of millivolts, for example. Typically, the converter 54 is unable to produce a converter voltage $V_{dd}$ below an internal feedback reference voltage $V_{fb}$ related to the converter 54, which is typically at least 0.6 V. Therefore, in addition to the converter 54, the charger 4 shown herein includes a voltage reference circuit 72 in order overall to produce a converter voltage $V_{dd}$ below the feedback reference voltage $V_{fb}$ of the converter 54. One exemplary embodiment of such a voltage reference circuit 72 is shown in FIG. 14 and has an external reference voltage $V_{ref}$ related to the converter 54, which is connected to a feedback connector 74 of the converter 54. The external reference voltage $V_{ref}$ is greater than the internal feedback reference voltage $V_{fb}$. Then, the voltage reference circuit 72 is configured and connected to the converter 54 so that the converter voltage $V_{dd}$ arises as a difference between, firstly, the internal feedback reference voltage $V_{fb}$ and, secondly, the difference between external reference voltage $V_{ref}$ and internal feedback reference voltage $V_{fb}$, weighted by a suitable resistance ratio R1/R2 of two resistors 76, 78, i.e., $V_{dd}=V_{fb}-R1\cdot(V_{ref}-V_{fb})/R2$. The two resistors 76, 78 form a voltage divider with two endpoints 80, to which, firstly, an output 82 of the converter 54 and, secondly, the external reference voltage $V_{ref}$ are connected, and with a midpoint 86 between the two resistors 76, 78, to which the feedback connector 74 is connected.

Further, the charger 4 includes a control unit 86, to which the communications unit 58 and the converter 54 are connected. The converter 54 is set by using the control unit 86, specifically on the basis of the data received by using the communications unit 58. The charger 4 still optionally includes an emergency energy storage unit 88 in order to nevertheless set the intermediate voltage and produce the switch-off signal to this end when the energy supply to the charger 4 is interrupted.

In an embodiment, the control unit 86 is configured to carry out one or more of the steps of the method described herein. The device 2 also includes a control unit 90 which is configured in an embodiment to carry out one or more of the steps of the method described herein.

Figure 15:
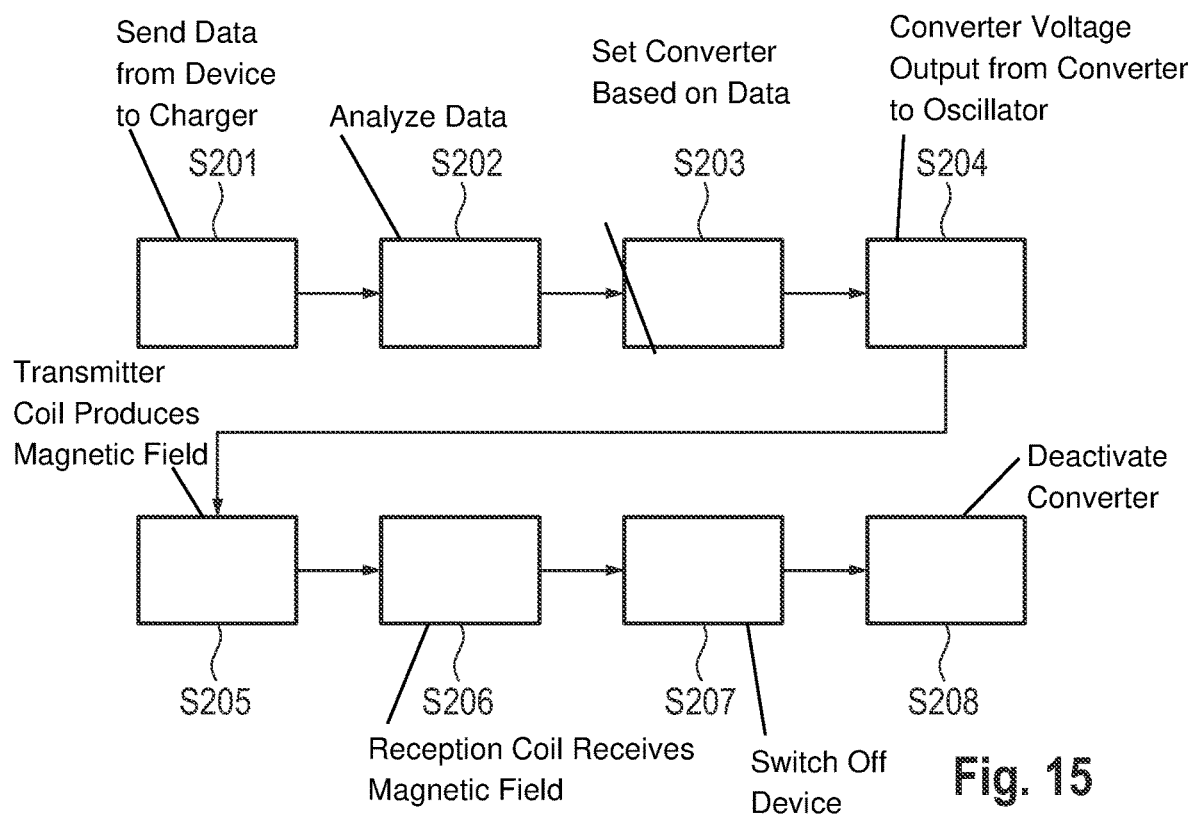
FIG. 15 is a flow chart showing eight steps of a method.

Overall, a method is realized by the switch-off circuit 22 in combination with the communications system, within the scope of which there is a wireless automatic switch-off of the device 2 initiated by the charger 4, specifically at the end of a charging process of the energy storage unit 16 of the device 2 and in general when an energy transfer from the charger 4 to the device 2 is interrupted. To this end, the method for example includes one or more of the steps shown in FIG. 15, preferably in the specified sequence. In a first step S201, the device 2 sends data to the charger 4, for example recurrently. The data are analyzed in a second step S202, for example by the control unit 86. To the extent the data are modulated, these are initially demodulated in the second step S202, for example by using the above-described demodulator circuit 68. The converter 54 is set on the basis of the data, for example by the control unit 86, in a third step S203. By way of example, the control unit 86 sets the converter 54 using a DAC signal or a PWM signal. In a fourth step S204, the converter 54 subsequently outputs a converter voltage $V_{dd}$ to the oscillator 56 and controls the latter as a result. Likewise in the fourth step S204, the oscillator 56 outputs a current $I_{tx}$ used then to operate the transmitter coil 44. Consequently, the current 6 is set indirectly by the converter 54 in the fourth step S204. The transmitter coil 44 produces a magnetic field M on the basis of the current $I_{tx}$ in a fifth step S205. The magnetic field M is received in a sixth step S206 by the reception coil 46, the latter producing a charging input voltage $V_{cc}$ in the device 2 on the basis thereof in such a way that, overall, the charger 4 induces a charging input voltage $V_{cc}$ in the device 2. Then, the device 2 is switched off in a seventh step S207 should the charging input voltage $V_{cc}$ be in the voltage range between the reset voltage $V_{rst}$ and the minimum gate-source threshold voltage $V_{gs\text{-}thres,min}$, that is to say if the charging input voltage $V_{cc}$ is an intermediate voltage as described above. Accordingly, the device 2 transitions into the off state AZ in the seventh step S207 if an intermediate voltage is present, and is then switched off. In the seventh step S207, the device 2 optionally only transitions into the off state AZ after a time t that is longer than a switching connector active time $t_{sca}$ has additionally elapsed, as described above. Ultimately, the automatic switch-off is implemented on the basis of data transmitted to the charger 4 by the device 2. In an optional eighth step S208, the converter 54 is finally also deactivated, preferably after a certain period of time t, for example 10 s, following the transition of the device 2 into the off state AZ.

The description until now has considered the device 2 being switched off once the charging has been completed. Then, the data contain at least the final charging input voltage $V_{cc}$, which is determined in conjunction with the final current $I_{tx}$ and which is also used in combination therewith by the control unit 88, in particular, in order to determine a converter voltage $V_{dd}$ and then set the converter. However, other events than the completion of the charging process are likewise suitable, in principle, for initiating the automatic switch-off, for example if a temperature of the energy storage unit 16 exceeds a limit temperature (overheating), if voltage or current at the energy storage unit 16 exceed a corresponding limit (overvoltage/overcurrent), and generally in the case of a flaw of the energy storage unit 16 (fault), or similar events. Then, the control unit 86 infers one or more of these events when the control unit 86 analyzes the data, and then controls the converter 54 accordingly in order to initiate the automatic switch-off.

The following is a summary list of reference numerals and the corresponding structure used in the above description of the invention.

LIST OF REFERENCE SIGNS

2 Device
4 Charger
6 Transmitter module
8 Reception module
10 Charging connector
12 Switching connector
14 Power management module
16 Energy storage unit
18 Consumer
20 Switch
22 Switch-off circuit
24 Microphone
26 Receiver
28 Depression
30 Lid
32 Transformation unit
34 Ground
36 Gate
38 Source
40 Drain
42 Resistor
44 Transmitter coil
46 Reception coil
48 Tuning capacitor
50 Smoothing capacitor
52 Schottky diode
54 Converter
56 Oscillator
58 Communications unit (of the device)
60 Communications unit (of the charger)
62 Voltage range (for the converter voltage)
64 Voltage range
66 Voltage range
68 Demodulator circuit
70 Capacitor
72 Voltage reference circuit
74 Feedback connector
76 Resistor
78 Resistor
80 Endpoint
82 Output
84 Midpoint
86 Control unit (of the charger)
88 Emergency energy storage unit
90 Control unit (of the device)
A Distance
AZ Off state
EZ State of discharge
$I_{tx}$ Current
k Coupling factor
$L_{rx}$ Inductance of the reception coil
$L_{tx}$ Inductance of the transmitter coil
LZ State of charge
M Magnetic field
S101-S104 Step
S201-S208 Step
$t_{disc}$ Discharge time
$t_{sca}$ Switching connector active time
$V_{bat}$ Voltage
$V_{cc}$ Charging input voltage
$V_{chg,thres}$ Charging threshold voltage
$V_{dd}$ Converter voltage
$V_{fb}$ Feedback reference voltage
$V_{gs\text{-}thres}$ Gate-source threshold voltage
$V_{gs\text{-}thres,max}$ Maximum gate-source threshold voltage
$V_{gs\text{-}thres,min}$ Minimum gate-source threshold voltage
$V_{OD}$ Object detection voltage
$V_{out}$ Voltage (from the power management module to consumers)

$V_{ref}$ Reference voltage
$V_{rst}$ Reset voltage
WZ Idle state
t Time

The invention claimed is:

1. A method, comprising:
connecting a device to a charger;
wirelessly charging the device in a state of charge by wirelessly transferring energy from a transmitter module of the charger to a reception module of the device;
consuming energy with the device in a state of discharge;
providing the device with a charging connector receiving a charging input voltage being adjustable by the charger for charging;
providing the device with a switching connector for turning the device on and off;
providing the device with a switch connected to the switching connector and being switchable by the charging input voltage by setting the charging input voltage to an intermediate voltage;
using the charger to set the charging input voltage to the intermediate voltage for switching the switch and transitioning the device into an off state having the device turned off; and
transferring energy during charging by using a magnetic field, producing the magnetic field by using a transmitter coil of the transmitter module, receiving the magnetic field at a reception coil of the reception module, and driving the transmitter module to induce the intermediate voltage in the device for setting the charging input voltage to the intermediate voltage.

2. A method, comprising:
connecting a device to a charger;
wirelessly charging the device in a state of charge by wirelessly transferring energy from a transmitter module of the charger to a reception module of the device;
consuming energy with the device in a state of discharge;
providing the device with a charging connector receiving a charging input voltage being adjustable by the charger for charging;
providing the device with a switching connector for turning the device on and off;
providing the device with a switch connected to the switching connector and being switchable by the charging input voltage by setting the charging input voltage to an intermediate voltage;
using the charger to set the charging input voltage to the intermediate voltage for switching the switch and transitioning the device into an off state having the device turned off;
completing charging once the charging input voltage drops below a charging threshold voltage; and
transitioning the device into the state of charge from the state of discharge or from the off state when the charging input voltage at least corresponds to the charging threshold voltage.

3. The method according to claim 2, which further comprises transitioning the device from the state of charge to an idle state when the charging input voltage is less than the charging threshold voltage and transitioning the device from the idle state into the state of discharge when the charging input voltage is less than a reset voltage.

4. The method according to claim 1, which further comprises:
providing the switch as a transistor including a gate, a source, and a drain;
connecting the gate to the charging connector and pulling the gate up to the charging input voltage by using a resistor;
connecting the gate through the resistor to the source and to ground; and
connecting the drain to the switching connector and connecting the source to ground.

5. The method according to claim 1, which further comprises:
providing the charger with a converter and an oscillator;
using the oscillator to produce a current for producing the magnetic field by way of the transmitter module;
using the converter to produce a converter voltage for operation of the oscillator; and
setting the charging input voltage by using the converter voltage.

6. The method according to claim 5, which further comprises:
controlling the converter voltage in dependence on a coupling factor between the transmitter module and the reception module; and
producing the intermediate voltage by setting the converter voltage by initially determining the coupling factor and then using the coupling factor to determine the converter voltage required to produce the intermediate voltage.

7. The method according to claim 6, which further comprises:
using the device to transmit a last charging input voltage applied to the charger during the charging, as a final charging input voltage;
using the charger to store the current, used for operating the transmitter coil at a time of the final charging input voltage, as a final current; and
receiving the final charging input voltage at the charger, whereupon the coupling factor then is determined in combination with the final current.

8. A method, comprising:
connecting a device to a charger;
wirelessly charging the device in a state of charge by wirelessly transferring energy from a transmitter module of the charger to a reception module of the device;
consuming energy with the device in a state of discharge;
providing the device with a charging connector receiving a charging input voltage being adjustable by the charger for charging;
providing the device with a switching connector for turning the device on and off;
providing the device with a switch connected to the switching connector and being switchable by the charging input voltage by setting the charging input voltage to an intermediate voltage;
using the charger to set the charging input voltage to the intermediate voltage for switching the switch and transitioning the device into an off state having the device turned off;
providing each of the device and the charger with a respective communications unit, for an interchange of data;
using the device to modulate the data for transfer;
using the charger to receive and demodulate the data; and
providing the charger with a demodulator circuit serving to demodulate and being used to additionally determine the current in the transmitter module.

9. The method according to claim 1, which further comprises providing the charger, in addition to the converter, with a voltage reference circuit for overall producing a converter voltage below a feedback reference voltage of the converter.

10. The method according to claim 1, which further comprises providing the charger with an emergency energy storage unit to set the intermediate voltage upon an interruption in an energy supply to the charger.

11. A device, comprising means for carrying out the method according to claim 1.

12. The device according to claim 11, wherein the device is a hearing aid.

13. A charger, comprising means for carrying out the method according to claim 1.

* * * * *